US011562764B2

(12) United States Patent
Schmidt et al.

(10) Patent No.: US 11,562,764 B2
(45) Date of Patent: Jan. 24, 2023

(54) APPARATUS, METHOD OR COMPUTER PROGRAM FOR GENERATING A BANDWIDTH-ENHANCED AUDIO SIGNAL USING A NEURAL NETWORK PROCESSOR

(71) Applicant: Fraunhofer-Gesellschaft zur Förderung der angewandten Forschung e.V., Munich (DE)

(72) Inventors: Konstantin Schmidt, Nuremberg (DE); Christian Uhle, Ursensollen (DE); Bernd Edler, Fuerth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 135 days.

(21) Appl. No.: 16/851,680

(22) Filed: Apr. 17, 2020

(65) Prior Publication Data

US 2020/0243102 A1 Jul. 30, 2020

Related U.S. Application Data

(63) Continuation of application No. PCT/EP2018/059593, filed on Apr. 13, 2018.

(30) Foreign Application Priority Data

Oct. 27, 2017 (EP) .................................... 17198997

(51) Int. Cl.
G10L 21/038 (2013.01)
G06N 20/10 (2019.01)
(Continued)

(52) U.S. Cl.
CPC ............ *G10L 21/038* (2013.01); *G06N 3/063* (2013.01); *G06N 3/084* (2013.01); *G06N 20/10* (2019.01);
(Continued)

(58) Field of Classification Search
CPC .................................................... G10L 21/038
See application file for complete search history.

(56) References Cited

U.S. PATENT DOCUMENTS

2002/0087304 A1* 7/2002 Kjorling ............... G10L 21/038
704/219
2003/0044024 A1 3/2003 Aarts et al.
(Continued)

FOREIGN PATENT DOCUMENTS

JP 2012027255 A 2/2012
JP 2016530548 A 9/2016
(Continued)

OTHER PUBLICATIONS

Yu Gu and Z.-H. Ling, "Restoring high frequency spectral envelopes using neural networks for speech bandwidth extension," 2015 International Joint Conference on Neural Networks (IJCNN), 2015, pp. 1-8, doi: 10.1109/IJCNN.2015.7280483. (Year: 2015).*
(Continued)

*Primary Examiner* — Shaun Roberts
(74) *Attorney, Agent, or Firm* — Perkins Coie LLP; Michael A. Glenn

(57) ABSTRACT

An apparatus for generating a bandwidth enhanced audio signal from an input audio signal having an input audio signal frequency range includes: a raw signal generator configured for generating a raw signal having an enhancement frequency range, wherein the enhancement frequency range is not included in the input audio signal frequency range; a neural network processor configured for generating a parametric representation for the enhancement frequency range using the input audio frequency range of the input audio signal and a trained neural network; and a raw signal processor for processing the raw signal using the parametric representation for the enhancement frequency range to obtain a processed raw signal having frequency components
(Continued)

in the enhancement frequency range, wherein the processed raw signal or the processed raw signal and the input audio signal frequency range of the input audio signal represent the bandwidth enhanced audio signal.

28 Claims, 19 Drawing Sheets

(51) Int. Cl.
```
G06N 3/063      (2006.01)
G06N 3/08       (2006.01)
G10L 19/005     (2013.01)
G10L 19/02      (2013.01)
G10L 21/02      (2013.01)
H04L 65/80      (2022.01)
H04L 65/75      (2022.01)
```
(52) U.S. Cl.
CPC ........... *G10L 19/005* (2013.01); *G10L 19/02* (2013.01); *G10L 21/02* (2013.01); *H04L 65/75* (2022.05); *H04L 65/80* (2013.01)

(56) References Cited

U.S. PATENT DOCUMENTS

| | | | |
|---|---|---|---|
| 2003/0158726 A1* | 8/2003 | Philippe | G10L 21/038 704/203 |
| 2005/0267739 A1* | 12/2005 | Kontio | G10L 21/038 704/E21.011 |
| 2007/0033028 A1* | 2/2007 | Yao | G10L 15/20 704/E15.039 |
| 2009/0198498 A1 | 8/2009 | Ramabadran et al. | |
| 2010/0057476 A1* | 3/2010 | Sudo | G10L 21/038 704/500 |
| 2011/0054885 A1 | 3/2011 | Nagel et al. | |
| 2014/0207443 A1 | 7/2014 | Hosoya et al. | |
| 2015/0332693 A1* | 11/2015 | Dietz | G10L 19/18 704/500 |
| 2016/0180854 A1 | 6/2016 | Lecomte et al. | |
| 2018/0261213 A1* | 9/2018 | Arik | G06N 3/0445 |
| 2019/0122679 A1 | 4/2019 | Nagisetty et al. | |

FOREIGN PATENT DOCUMENTS

| | | |
|---|---|---|
| RU | 2455710 C2 | 7/2012 |
| RU | 2688247 C2 | 5/2019 |
| WO | 0180223 A1 | 10/2001 |
| WO | 2013098885 A1 | 7/2013 |

OTHER PUBLICATIONS

J. Kontio, L. Laaksonen and P. Alku, "Neural Network-Based Artificial Bandwidth Expansion of Speech," in IEEE Transactions on Audio, Speech, and Language Processing, vol. 15, No. 3, pp. 873-881, Mar. 2007, doi: 10.1109/TASL.2006.885934. (Year: 2007).*
Cox, Richard V., et al., "Improving upon toll quality speech for VoIP", XP010780286, DOI: 10.1109/ACSSC.2004.1399163; ISBN: 978-0-7803-8622-8; pp. 405-409, May 26, 2013.
Liu, Hao-Jie , et al., "Spectral envelope estimation used for audio bandwidth extension based on RBF neural network", XP032508903, ISSN: 1520-6149, DOI: 10.1109/ICASSP.2013.6637706 [retrieved on Oct. 18, 2013]; May 26, 2013 (May 26, 2013), pp. 543-547.
Schmidt, Konstantin , et al., "Low complexity tonality control in the Intelligent Gap Filling tool", XP032900680, DOI: 10.1109/ICASSP. 2016.7471754 [retrieved on May 18, 2016]; Mar. 20, 2016 (Mar. 20, 2016), pp. 644-648.
"ITU-T recommendation P.800. methods for objective and subjective assessment of quality", ITU-T, International Telecommunication Union; Series P: Telephone Transmission Quality; 1996, 1996.
"ITU-T recommendation P.810. modulated noise reference unit (MNRU)", ITU-T International Telecommunication Union; Telephone Transmission Quality; 1996, 1996.
Abel, Johannes , et al., "A subjective listening test of six different artificial bandwidth extension approaches in English, Chinese, German, and Korean", In 2016 IEEE International Conference on Acoustics, Speech and Signal Processing, ICASSP 2016, Shanghai, China, Mar. 20-25, 2016, pp. 5915-5919, Mar. 2016.
Bauer, Patrick, et al., "Hmm-based artificial bandwidth extension supported by neural networks", In 14th International Workshop on Acoustic Signal Enhancement, IWAENC 2014, Juan-les-Pins, France, Sep. 8-11, 2014, pp. 1-5, Sep. 2014.
Bauer, Patrick, et al., "Impact of hearing impairment on fricative intelligibility for artificially bandwidth-extended telephone speech in noise", In IEEE International Conference on Acoustics, Speech and Signal Processing, ICASSP 2013, Vancouver, BC, Canada, May 26-31, 2013, pp. 7039-7043, May 2013.
Bauer, Patrick, et al., "On improving speech intelligibility in automotive hands-free systems", In IEEE International Symposium on Consumer Electronics (ISCE 2010), Jun. 2010, pp. 1-5, Jun. 2010.
Bauer, Patrick, et al., "On improving telephone speech intelligibility for hearing impaired persons", In Proceedings of the 10. ITG Conference on Speech Communication, Braunschweig, Germany, Sep. 26-28, 2012, pp. 1-4, Sep. 2012.
Bruhn, Stefan , et al., "Standardization of the new 3GPP EVS codec", In 2015 IEEE International Conference on Acoustics, Speech and Signal Processing, ICASSP 2015, South Brisbane, Queensland, Australia, Apr. 19-24, 2015, pp. 5703-5707, Apr. 2015.
Chollet, Francois , et al., "Keras 1.2.2", website: https://github.com/fchollet/keras, 2015.
Chung, Junyoung , et al., "Empirical evaluation of gated recurrent neural networks on sequence modeling", NIPS Deep Learning workshop, Montreal, Canada, 2014.
Cox, R.V., et al., "Improving upon toll quality speech for VoIP", Signals, Systems & Computers, 2004. Conf. Record of the 38th Asilomar Confrc Pacific Grove, CA, USA Nov. 7-10, 2004, Piscataway, NJ, USA, IEEE, vol. 1, Nov. 7, 2004, p. 405-409, XP010780286, DOI: 10.1109/ACSSC. 2004.1399163ISBN: 978-0-7803-8622-8, Nov. 2004.
Dietz, Martin , et al., "Spectral band replication, a novel approach in audio coding", In Audio Engineering Society Convention 112, Apr. 2002, Apr. 2002.
Disch, Sascha, et al., "Intelligent gap filling in perceptual transform coding of audio," in Audio Engineering Society Convention 141, Los Angeles, Sep. 2016, Sep. 2016.
Duchi, John C., et al., "Adaptive subgradient methods for online learning and stochastic optimization", In COLT 2010—The 23rd Conference on Learning Theory, Haifa, Israel, Jun. 27-29, 2010, pp. 257-269, Jun. 2010.
Fastl, Hugo , et al., "Psychoacoustics: Facts and Models", Springer-Verlag New York, Inc., Secaucus, NJ, USA, 2006, 2006.
Gu, Yu , et al., "Speech bandwidth extension using bottleneck features and deep recurrent neural networks", In Interspeech 2016, 17th Annual Conference of the International Speech Communication Association, San Francisco, CA, USA, Sep. 8-12, 2016, pp. 297-301, Sep. 2016.
Gu, Yu , et al., "Waveform modeling using stacked dilated convolutional neural networks for speech bandwidth extension", In Interspeech 2017, 18th Annual Conference of the International Speech Communication Association, Stockholm, Sweden, Aug. 20-24, 2017, pp. 1123-1127, Aug. 2017.
Hochreiter, Sepp , et al., "Long short-term memory", Neural Computation, vol. 9, No. 8, pp. 1735-1780, 1997, 1997.
Jax, Peter , et al., "Wideband extension of telephone speech using a hidden markov model", IEEE Workshop on Speech Coding. Proceedings., 2000, pp. 133-135, 2000.
Lecun, Yann , et al., "Gradient-based learning applied to document recognition", Proceedings of the IEEE, vol. 86, No. 11, pp. 2278-2324, Nov. 1998, 1998.
Li, Kehuang , et al., "A deep neural network approach to speech bandwidth expansion", In 2015 IEEE International Conference on

(56) References Cited

OTHER PUBLICATIONS

Acoustics, Speech and Signal Processing, ICASSP 2015, South Brisbane, Queensland, Australia, Apr. 19-24, 2015, pp. 4395-4399, Apr. 2015.
Liu, Hao-Jie, et al., "Spectral envelope estimation used for audio bandwidth extension based on RBF neural network", IEEE Int'l Conference on Acoustics, Speech & Signal Processing (ICASSP) Vancouver, BC; May 26-31, 2013, Inst. of Electrical & Electronics Engineers, Piscataway, NJ, US, May 26, 2013, p. 543-547, XP032508903,ISSN: 1520-6149, DOI: 10.1109/ICASSP.2013. 6637706, May 2013.
Panayotov, Vassil, et al., "Librispeech: An ASR corpus based on public domain audio books", In 2015 IEEE International Conference on Acoustics, Speech and Signal Processing, ICASSP 2015, South Brisbane, Queensland, Australia, Apr. 19-24, 2015, pp. 5206-5210, Apr. 2015.
Pulakka, Hannu, et al., "Bandwidth extension of telephone speech using a neural network and a filter bank implementation for highband mel spectrum", IEEE Trans. Audio, Speech & Language Processing, vol. 19, No. 7, pp. 2170-2183, 2011, 2011.
Schmidt, Konstantin, et al., "Low complexity tonality control in the intelligent gap filling tool", In 2016 IEEE International Conference on Acoustics, Speech and Signal Processing, ICASSP 2016, Shanghai, China, Mar. 20-25, 2016, pp. 644-648, Mar. 2016.
Van Den Oord, Aaron, et al., "Wavenet: A generative model for raw audio", In The 9th ISCA Speech Synthesis Workshop, Sunnyvale, CA, USA, Sep. 13-15, 2016, p. 125, Sep. 2016.

\* cited by examiner (SPECTRAL WHITENING)

(RAW SIGNAL GENERATOR)

(NN PROCESSOR)

(RAW SIGNAL PROCESSOR)

(NEURAL NETWORK)

APPARATUS, METHOD OR COMPUTER PROGRAM FOR GENERATING A BANDWIDTH-ENHANCED AUDIO SIGNAL USING A NEURAL NETWORK PROCESSOR

CROSS-REFERENCES TO RELATED APPLICATIONS

This application is a continuation of copending International Application No. PCT/EP2018/059593, filed Apr. 13, 2018, which is incorporated herein by reference in its entirety, and additionally claims priority from European Application No. EP 17198997.3, filed Oct. 27, 2017, which is incorporated herein by reference in its entirety.

The present invention is related to audio processing and, in particular, to bandwidth enhancement technologies for audio signals such as bandwidth extension or intelligent gap filling.

BACKGROUND OF THE INVENTION

Today's most used codec for mobile speech communication is still AMR-NB which encodes only frequencies from 200 to 3400 Hz (usually named narrowband, (NB)). The human speech signal though has a much wider bandwidth—especially fricatives often have most of their energy above 4 kHz. Limiting the frequency range of speech will not only sound less pleasant but will also be less intelligible [1, 2].

State-of-the-art audio codecs like EVS [3] are able to code a much wider frequency range of the signal, but using these codecs will involve a change of the whole communication network including the receiving devices. This is a huge effort and known to last several years. Blind bandwidth extensions (BBWE—also known as artificial bandwidth extension or blind bandwidth expansion) are able to extent the frequency range of a signal without the need of additional bits. They are applied to the decoded signal only and do not need any adaption of the network or the sending device. While being an appealing solution to the problem of limited bandwidth of narrow band codecs lots of systems fail to improve the quality of speech signals. In a joint evaluation of latest bandwidth extensions, only four out of 12 systems managed to improve the perceived quality significantly for all tested languages [4].

Following the source-filter model of speech production most bandwidth extensions (blind or non-blind) have two main building blocks—the generation of an excitation signal and estimation of the vocal tract shape. This is also the approach the presented system follows. A commonly used technique for generating the excitation signal is spectral folding, translation or nonlinear processing. The vocal tract shape can be generated by Gaussian Mixture Models (GMM), Hidden Markov Models (HMM), Neural Networks or Deep Neural Networks (DNN). These models predict the vocal tract shape from features calculated on the speech signal.

In [5] and [6] the excitation signal is generated by spectral folding and the vocal tract filter is realized as all-pole filter in time-domain by an HMM. First a codebook of linear prediction coefficients (LPC) calculated on frames containing the upper band speech signal is created by vector quantization. At decoder-side, features are calculated on the decoded speech signal and an HMM is used to model the conditional probability of a codebook entry given the features. The final envelope is the weighted sum of all codebook entries with the probabilities being the weights. In [6] fricative sounds are additionally emphasized by a neural network.

In [7] the excitation signal is also generated by spectral folding and the vocal tract is modeled by a neural network which outputs gains applied to the folded signal in a Mel filterbank domain.

In [8] a DNN is used to predict the spectral envelope of a spectral folded excitation signal (phrased here as imaged phase). The system in [9] also uses the spectral folded excitation signal and shapes the envelope by a DNN comprising LSTM layers. Using several frames of audio as input for the DNN these two systems have an algorithmic delay too high for real-time telecommunication.

A recent approach directly models the missing signal in time-domain [10] with an algorithmic delay of 0 to 32 ms with an architecture similar to WaveNet [11].

When speech is transmitted for telecommunication, its frequency range is usually limited e.g. by band limitation and downsampling. If this band limitation is removing too much bandwidth from the signal the perceived quality of the speech is lowered significantly. One way to overcome this would imply the change of the codec by transmitting more bandwidth.

This often involves the change of the whole network infrastructure which is very costly and can last several years.

Another way to extend the frequency is by extending the frequency range artificially by bandwidth extension. In case the bandwidth extension is blind, no side information is transmitted from the encoder to the decoder. No changes have to be made to the transmitting infra structure.

SUMMARY

According to an embodiment, an apparatus for generating a bandwidth enhanced audio signal from an input audio signal having an input audio signal frequency range may have: a raw signal generator configured for generating a raw signal having an enhancement frequency range, wherein the enhancement frequency range is not included in the input audio signal frequency range; a neural network processor configured for generating a parametric representation for the enhancement frequency range using the input audio frequency range of the input audio signal and a trained neural network; and a raw signal processor for processing the raw signal using the parametric representation for the enhancement frequency range to obtain a processed raw signal having frequency components in the enhancement frequency range, wherein the processed raw signal or the processed raw signal and the input audio signal frequency range of the input audio signal represent the bandwidth-enhanced audio signal.

According to another embodiment, a system for processing an audio signal may have: a core audio decoder for decoding a core audio signal organized in frames, wherein the core audio decoder is configured for detecting an error situation involving a frame loss or an erroneous frame, and wherein the core audio decoder is configured to perform an error concealment operation to obtain a substitute frame for the error situation, and the apparatus of claim 1, wherein the apparatus is configured for using the substitute frame as the input audio signal and for generating the bandwidth enhanced audio signal for the error situation.

According to another embodiment, a system for processing an audio signal may have: an input interface for receiving an input audio signal and parametric side information for the enhancement frequency range; the apparatus for generating an inventive bandwidth-enhanced audio signal, wherein the raw signal processor is configured to use the parametric side in-formation in addition to the parametric representation provided by the neural network processor to generate the bandwidth-enhanced audio signal.

According to yet another embodiment, a method of generating a bandwidth enhanced audio signal from an input audio signal having an input audio signal frequency range may have the steps of: generating a raw signal having an enhancement frequency range, wherein the enhancement frequency range is not included in the input audio signal frequency range; generating a parametric representation for the enhancement frequency range using the input audio frequency range of the input audio signal and a trained neural network; and processing the raw signal using the parametric representation for the enhancement frequency range to obtain a processed raw signal having frequency components in the enhancement frequency range, wherein the processed raw signal or the processed raw signal and the input audio signal frequency range of the input audio signal represent the bandwidth-enhanced audio signal.

According to yet another embodiment, a method of processing an audio signal may have the steps of: decoding a core audio signal organized in frames, wherein the core audio decoder is configured for detecting an error situation involving a frame loss or an erroneous frame, and wherein the decoding performs an error concealment operation to obtain a substitute frame for the error situation, and the method for generating a bandwidth enhanced audio signal, wherein the method uses the substitute frame as the input audio signal and generates the bandwidth enhanced audio signal for the error situation.

According to yet another embodiment, a method of processing an audio signal may have the steps of: receiving an input audio signal and parametric side information for the enhancement frequency range; generating a bandwidth-enhanced audio signal in accordance with the inventive method, wherein the processing the raw signal includes using the parametric side in-formation in addition to the parametric representation provided by the neural network to generate the bandwidth-enhanced audio signal.

According to another embodiment, a non-transitory digital storage medium may have: a computer program stored thereon to perform the inventive methods, when said computer program is run by a computer.

The present invention is based on the finding that a neural network can be advantageously used for generating a bandwidth-extended audio signal. However, the neural network processor implementing the neural network is not used for generating the full enhancement frequency range, i.e., the individual spectral lines in the enhancement frequency range. Instead, the neural network processor receives, as an input, the input audio signal frequency range and outputs a parametric representation for the enhancement frequency range. This parametric representation is used for performing a raw signal processing of a raw signal that has been generated by a separate raw signal generator. The raw signal generator may be any kind of signal synthesizer for the enhancement frequency range such as a patcher as known from bandwidth extension such as spectral band replication procedures or from intelligent gap filling procedures. The patched signal can then be spectrally whitened, or, alternatively, the signal can be spectrally whitened before being patched. And, then, this raw signal which is a spectrally whitened patched signal is further processed by the raw signal processor using the parametric representation provided from the neural network in order to obtain the processed raw signal having frequency components in the enhancement frequency range. The enhancement frequency range is a high band in the application scenario of a straightforward bandwidth extension where the input audio signal is a narrow band or low band signal. Alternatively, the enhancement frequency range refers to certain spectral holes between the maximum frequency and a certain minimum frequency that are filled by the intelligent gap filling procedures.

Alternatively, the raw signal generator can also be implemented to generate an enhancement frequency range signal using any kind of non-linearity processing or noise processing or noise generation.

Since the neural network is only used for providing a parametric representation of the high band rather than the full high band or the complete enhancement frequency range, the neural network can be made less complex and, therefore, efficient compared to other procedures where a neural network is used for generating the full high band signal. On the other hand, the neural network is fed with the low band signal and, therefore, an additional feature extraction from the low band signal as is also known from neural network-controlled bandwidth extension procedures is not required. Furthermore, it has been found that the generation of the raw signal for the enhancement frequency range can be made in a straightforward way and, therefore, very efficiently without a neural network processing, and the subsequent scaling of this raw signal or, generally, the subsequent raw signal processing can also be made without any specific neural network support. Instead, the neural network support is only useful for generating the parametric representation for the enhancement frequency range signal and, therefore, an optimum compromise is found between conventional signal processing on the one hand for generating the raw signal for the enhancement frequency range and the shaping or processing of the raw signal and, additionally, the non-conventional neural network processing that, in the end, generates the parametric representation that is used by the raw signal processor.

This distribution between conventional processing and neural network processing provides an optimum compromise with respect to audio quality, and neural network complexity with respect to the neural network training as well as the neural network application that has to be performed in any bandwidth enhancement processors.

Advantageous embodiments rely on different time resolutions, i.e., a quite low time resolution and, advantageously, a quite high frequency resolution for generating the whitened raw signal. On the other hand, the neural network processor and the raw signal processor operate based on a high time resolution and, therefore, advantageously a low frequency resolution. However, there can also be the case that the low time resolution is accompanied by a high frequency resolution or the high time resolution Thus, again an optimum compromise is found between the fact that the neural network has a parametric resolution which is, for example with respect to frequency, coarser than the full amplitude representation. Furthermore, the neural network processor, by operating with a higher time resolution can optimally make use of time history, i.e., can rely with a high efficiency on time changes of parameters for the parametric representation that are specifically useful for audio processing and, particularly, for bandwidth extension or bandwidth enhancement procedures.

A further Advantageous aspect of the present invention relies on a certain useful whitening procedure that divides the originally generated raw signal by its spectral envelope generated by low-pass or generally FIR filtering the power spectrum with a very easy low-pass filter such as a three, four or five taps low-pass filter where all taps are set to 1 only. This procedure serves two purposes. The first one is that the formant structure is removed from the original raw signal and the second purpose is that the ratio of the energy of the harmonics to the noise is lowered. Thus, such a whitened signal will sound much more natural than, for example, an LPC residual signal and, such a signal is particularly well-suited to parametric processing using the parametric representation generated by the neural network processor.

A further aspect of the present invention relies on the advantageous embodiment, in which the neural network processor is not fed with the amplitude spectrum, but is fed with the power spectrum of the input audio signal. Furthermore, in this embodiment, the neural network processor outputs a parametric representation and, for example, spectral envelope parameters in a compressed domain such as a LOG domain, a square root domain or a $(\ )^{1/3}$ domain. Then, the training of the neural network processor is more related to human perception, since the human perception operates in a compressed domain rather than a linear domain. On the other hand, the thus generated parameters are converted to a linear domain by the raw signal processor so that, in the end, a processed linear spectral representation of the enhancement frequency range signal is obtained, though the neural network operates with a power spectrum or even a loudness spectrum (the amplitudes are raised to the power of 3) and the parametric representation parameters or at least part of the parametric representation parameters is output in the compressed domain such as a LOG domain or a $(\ )^{1/3}$ domain.

A further advantageous aspect of the present invention is related to the implementation of the neural network itself. In one embodiment, the input layer of the neural network receives at two-dimensional time/frequency representation of the amplitude spectrum or, advantageously, the power or the loudness spectrum. Thus, the input layer into the neural network is a two-dimensional layer having the full frequency range of the input audio signal and, additionally, having certain number of preceding frames as well. This input advantageously is implemented as a convolutional layer having one or more convolutional kernels that, however, are quite small convolutional kernels convoluting, for example, only less than or equal to five frequency bins and less than or equal to 5 time frames, i.e., the five or less frequency bins from only five or less time frames. This convolutional input layer is followed advantageously by a further convolutional layer or a further delated convolutional layer that can or cannot be enhanced by residual connections. In an embodiment, the output layer of the neural network outputting the parameters for the parametric representation in, for example, values in a certain value range can be a convolutional layer or a fully connected layer connected to a convolutional layer so that any recurrent layers are not used in the neural network. Such neural networks are, for example, described in "An empiric evaluation of generic convolutional and recurrent networks for sequence modeling" by S. by Bai et al, Mar. 4, 2018, arXiv: 1803.0127 lvl [cs. LG]. Such networks described in this publication do not at all rely on recurrent layers, but only rely on certain convolutional layers.

However, in a further embodiment, recurrent layers such as LSTM-layers (or GRU-layers) are used in addition to one or more convolutional layers. The last layer or output layer of the network may or may not be a fully-connected layer with a linear output function. This linear output function allows the network to output unlimited continuous values. However, such a fully-connected layer is not necessarily required, since a reduction of the two-dimensional (large) input layer to the one-dimensional output parameter layer per time index can also be performed by tailoring two or more higher convolutional layers or by specifically tailoring two or more recurrent layers such as LSTM or GRU-layers.

Further aspects of the present invention relate to the specific application of the inventive bandwidth enhancement apparatus such as for a blind bandwidth extension only for concealment, i.e., when a frame loss has occurred. Here, the audio codec may have a non-blind bandwidth extension or no bandwidth extension at all and the inventive concept predicts a part of the signal missing due to a frame loss or predicts the whole missing signal.

Alternatively, the inventive processing using a neural network processor is not only used as a fully blind bandwidth extension, but is used as a part of a non-blind bandwidth extension or intelligent gap filling, where a parametric representation generated by the neural network processor is used as a first approximation which is refined, for example, in the parameter domain by some sort of data quantization controlled by a very small number of bits transmitted as additional side information such as a single bit per selected parameter such as the spectral envelope parameters. Thus, an extremely low bitrate guided extension is obtained that, however, relies on a neural network processing within the encoder for generating the additional low bitrate side information and that, at the same time, operates in the decoder in order to provide the parametric representation from the input audio signal and, then, this parametric representation is refined by the additional very low bitrate side information.

Further embodiments provide a blind bandwidth extension (BBWE) that expands the bandwidth of telephone speech which is often limited to 0.2 to 3.4 kHz. The advantage is an increased perceived quality as well as increased intelligibility. An embodiment presents a blind extension similar to state-of-the-art bandwidth enhancement like in intelligent gap filling or bandwidth extension or spectral band replication with the difference that all processing is done in the decoder without the need for transmitting extra bits. Parameters like spectral envelope parameters are estimated by a regressive convolutional deep neural network (CNN) with long short-term memory (LSTM). In an embodiment, the procedure operates on frames of 20 ms without additional algorithmic delay and can be applied in state-of-the-art speech and audio codecs. These embodiments exploit the performance of convolutional and recurrent networks to model the spectral envelope of speech signals.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
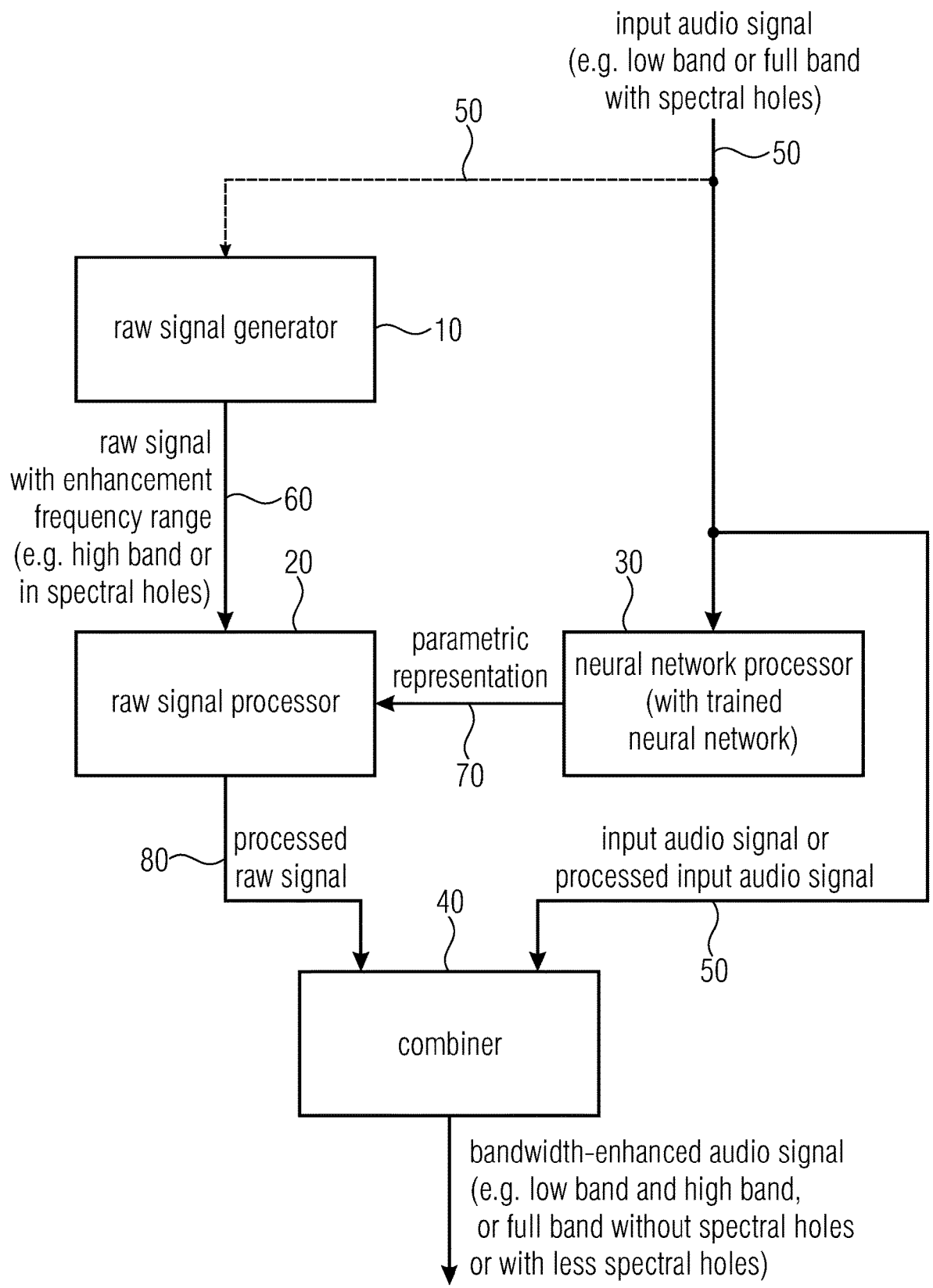
FIG. 1 is a block diagram for an apparatus for generating a bandwidth-enhanced audio signal for an input audio signal.

FIG. 1 illustrates an advantageous embodiment for an apparatus for generating a bandwidth-enhanced audio signal from an input audio signal 50 having an input audio signal frequency range. The input audio signal frequency range can be a low band range or a full band range but with smaller or larger spectral holes.

The apparatus comprises a raw signal generator 10 for generating a raw signal 60 having an enhancement frequency range, wherein the enhancement frequency range is not included in the input audio signal frequency range. The apparatus further comprises a neural network processor 30 configured for generating a parametric representation 70 for the enhancement frequency range using the input audio signal frequency range of the input audio signal and using a trained neural network. The apparatus furthermore comprises a raw signal processor 20 for processing the raw signal 60 using the parametric representation 70 for the enhancement frequency range to obtain a processed raw signal 80 having frequency components in the enhancement frequency range. Furthermore, the apparatus comprises, in a certain implementation, an optional combiner 40 that outputs the bandwidth-enhanced audio signal such as a signal with a low band and high band or a full band signal without spectral holes or with less spectral holes than before, i.e., compared to the input audio signal 50.

Figure 4:
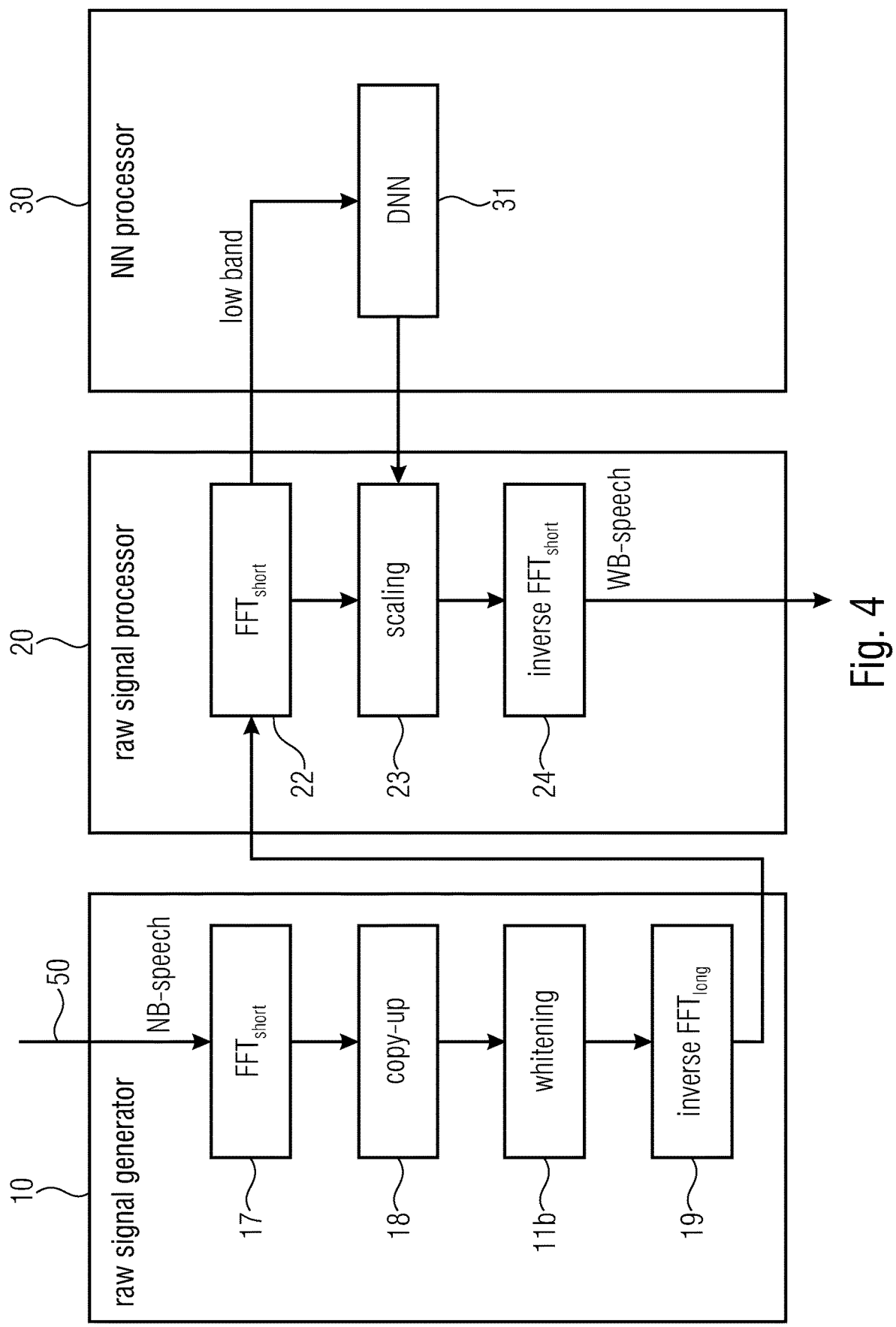
FIG. 4 is an advantageous implementation of the apparatus for generating a bandwidth-enhanced audio signal in accordance with the present invention.

The processed raw signal 80 can already be, depending on the processing of the raw signal processor, the bandwidth-extended signal, when the combination of the processed raw signal with the input audio signal frequency range is, for example, performed within a spectrum-time-conversion as, for example, discussed with respect to FIG. 4. Then, the combination is already performed by this spectral-time converter and the combiner 40 in FIG. 1 is part of this spectral-time converter. Alternatively, the processed raw signal can be a time domain enhancement signal that is combined with the time domain input audio signal by a separate combiner that would then perform a sample wise addition of two time domain signals. Other procedures for combining an enhancement signal and the original input signal are well-known for those skilled in the art.

Furthermore, it is Advantageous that the raw signal generator uses the input audio signal for generating the raw signal as illustrated by the broken line 50 leading into the raw signal generator 10. Procedures that operate using the input audio signal are patching operations such as copy-up operations, harmonic patching operations, mixes of copy-up operations and harmonic patching operations, or other patching operations that, at the same time, effect a mirroring of the spectrum.

Alternatively, the raw signal generator can operate without having reference to the input audio signal. Then, the raw signal generated by the raw signal generator 10 can be a signal that is noise-like and, the raw signal generator would comprise some kind of noise generator or some kind of random function generating noise. Alternatively, the input audio signal 50 could be used and could be processed by some sort of non-linearity in the time domain such as sgn(x) times $x^2$, where sgn( ) is the sign of x. Alternatively, other non-linear processings would be clipping procedures or other time domain procedures. A further procedure would be an advantageous frequency domain procedure performing a frequency-shifted version of the band limited input signal such as a copy-up, a mirroring in the spectral domain or anything like that. However, the mirroring in the spectral domain could also be performed by time domain processing operations where zeroes are inserted between samples and, when, for example, one zero is inserted between two samples, a mirroring of the spectrum is obtained. When two zeroes are inserted between two samples, then this would constitute a non-mirrored copy-up operation in a higher spectral range etc. Thus, it becomes clear that the raw signal generator can operate in the time domain or in the spectral domain in order to generate a raw signal within the enhancement frequency range that is advantageously a whitened signal as illustrated with respect to FIG. 2a. However, this whitening does not necessarily have to be performed in the spectral domain, but could also be performed in the time domain such as by LPC filtering and, then, the LPC residual signal would be a whitened time domain signal. However, as will be outlined later on, a certain spectral domain whitening operation is Advantageous for the purpose of the present invention.

In an advantageous implementation, the neural network processor receives, as an input, the audio signal or, particularly, a sequence of frames of spectral values of the audio signal, where the spectral values are either amplitude values but are, more advantageously, power values, i.e., spectral values or amplitudes raised to a certain power, where the power is, for example, 2 (power domain) or 3 (loudness domain), but, generally powers between 1.5 and 4.5 can be used for processing the spectral values before feeding them into the neural network. This is, for example, illustrated in FIG. 5 at item 32 illustrating the power spectrum converter for converting a sequency of low band amplitude spectral frames into a time sequence of spectral frames, and, then, the time sequence of spectral frames be it linear amplitudes or power amplitudes or loudness amplitudes are input into the trained neural network 31 that outputs parametric data advantageously in the compressed domain. These parametric data can be any parametric data describing the missing or bandwidth enhancement signal like tonality parameters, temporal envelope parameters, spectral envelope parameters such as scale factor band energies, distribution quantizer values, energy or tilt values. Other parameters that are, for example, known from spectral band replication processing are inverse filtering parameters, noise addition parameters or missing harmonics parameters that can also be used in addition to spectral envelope parameters. Advantageous spectral envelope parameters or a kind of a "base line" parametric representation are spectral envelope parameters and, advantageously, absolute energies or powers for a number of bands. In the context of a true bandwidth extension where the input audio signal is only a narrow band signal, the enhancement range could, for example, have only four or five bands or, at the most, ten enhancement bands, and, then, the parametric representation would only consist of a single energy or power or amplitude-related value per band, i.e., ten parameters for exemplary ten bands.

In an embodiment, the bandwidth extension can be used as an extension of any kind of speech and audio codec such as a 3GPP's enhanced voice service (EVS) or MPEG AAC. The input into the bandwidth extension processing illustrated in FIG. 1 is the decoded and, exemplarily, band-limited audio signal. The output is an estimate of the missing signal. The estimate could be the signal as a waveform or the coefficients of a transform such as an FFT or a modified discrete Cosine transform (MDCT) or the like. The parameters generated by the neural network processor 30 are the parameters of the parametric representation 70 that have been exemplarily discussed before.

Where the signal is described by some coarse parameters, the artificial signal is generated and is then modified by the parameters estimated by the neural network processor 30.

Figure 2A:
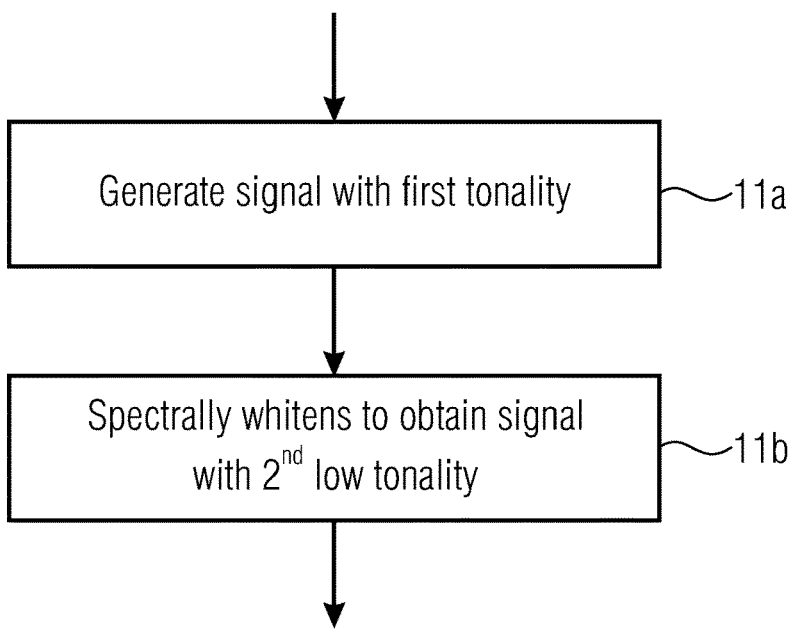
FIG. 2a is an advantageous functionality of the raw signal generator of FIG. 1.

FIG. 2a illustrates an advantageous procedure performed by the raw signal generator 10. In a step 11a, the raw signal generator generates a signal with a first tonality, and in a further step 11b, the raw signal generator spectrally whitens the signal with the first tonality to obtain a signal with a second low tonality. In other words, the tonality of the second signal is lower than the tonality of the first signal or/and the signal obtained by step 11b is whiter or more white than the signal generated by step 11a.

Figure 2B:
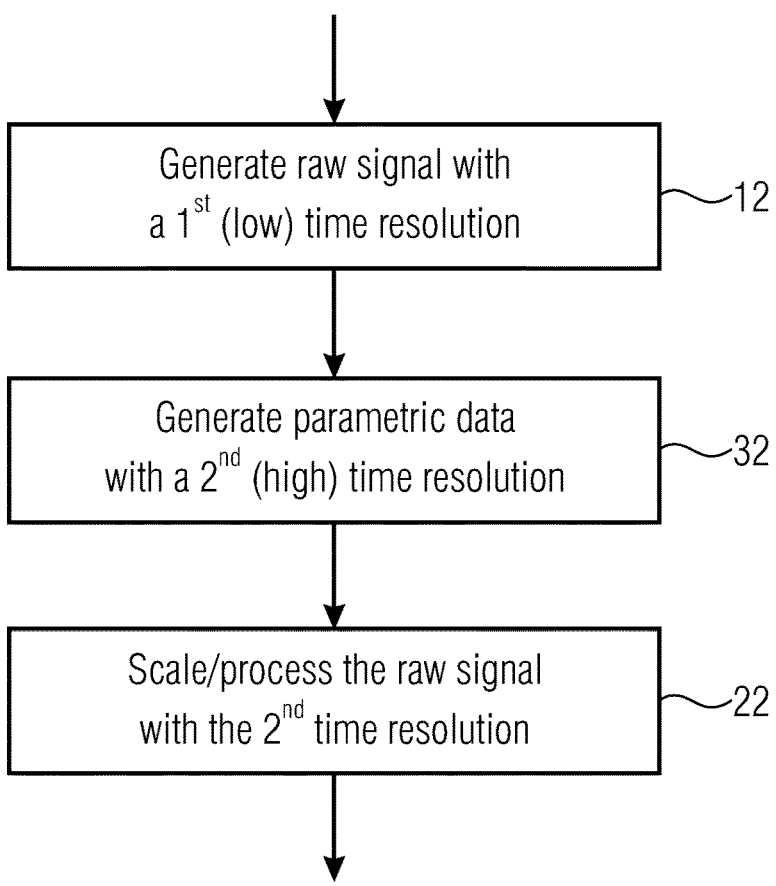
FIG. 2b is an advantageous implementation of the apparatus of FIG. 1, where different time resolutions are applied in the raw signal generator on the one hand and the neural network processor and the raw signal processor on the other hand.

Furthermore, FIG. 2b illustrates a certain Advantageous implementation of the cooperation between the raw signal generator 10 on the one hand and the neural network processor 30 and the raw signal processor 20 on the other hand. As outlined at 12, the raw signal generator generates a raw signal with a first (low) time resolution, and as outlined as 32, the neural network processor 30 generates parametric data with a second (high) time resolution, and the raw signal processor 20 then scales or processes the raw signal with the second or high time resolution in accordance with the time resolution of the parametric representation. Advantageously, the time resolution in blocks 32 and 22 is the same, but, alternatively, these blocks could even rely on different time resolutions, as long as the time resolution of block 32 is higher than the spectrally whitening time resolution used in step 12, and as long as the time resolution used for scaling/processing the raw signal is higher than the time resolution of the generation of the raw signal illustrated at block 12 in FIG. 2b. Thus, there generally exist two embodiments, i.e., the raw signal is generated with the low time resolution and the processing and the neural network is done with the high time resolution, or the raw signal is generated with the high frequency resolution and the processing and the neural network is done with the low frequency resolution.

Figure 2C:
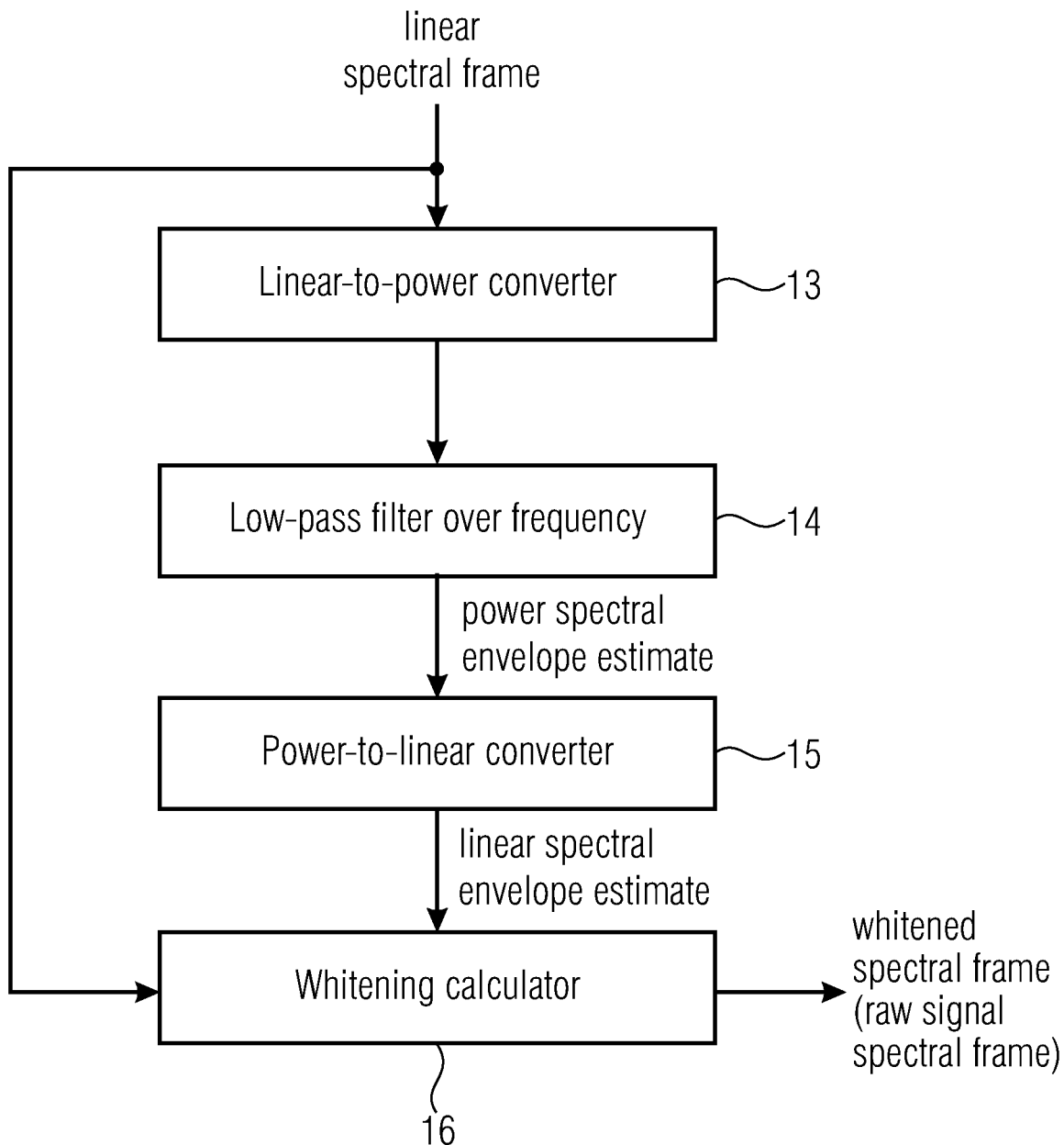
FIG. 2c is an advantageous implementation of performing a spectral whitening operation within the raw signal generator using a low-pass filter over frequency.
Figure 2D:
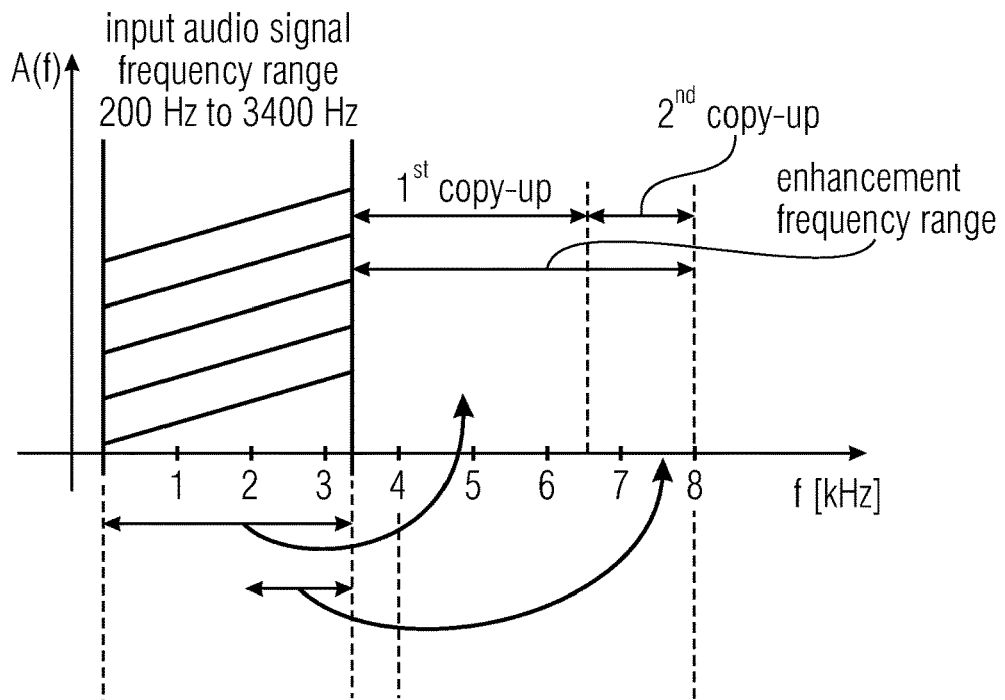
FIG. 2d is a sketch illustrating the spectral situation of an advantageous two-times copy-up operation.

FIG. 2d illustrates a situation of the spectra in an implementation, wherein the input signal is a narrow band input signal for example between 200 Hz and 3.4 kHz, and the bandwidth enhancing operation is a true bandwidth extension. Here, the input audio signal is input in a time-to-frequency converter 17 illustrated in FIG. 3. Then, a patching by a patcher 18 is performed and, subsequent to the patching, a whitening step 11b is performed and, then, the result is converted into the time domain by a frequency-to-time converter. The output of block 19 of FIG. 3 can be only a time domain raw signal or a time domain raw signal and an input audio signal. Furthermore, it is to be noted that the order of operations between the whitener 11b and the patcher 18 can be exchanged, i.e., that the whitener can operate on the signal output by the time-to-frequency converter, i.e., the low band signal or input audio signal and, subsequently, the already-whitened signal is patched either a single time or, as illustrated in FIG. 2d, two times, i.e., by a first copy-up and a second copy-up so that the full enhancement frequency range is made-up by the frequency range of the first copy-up operation and the second copy-up operation. Naturally, the patcher 18 in FIG. 3 does not necessarily have to perform the copy-up operation, but could also perform a spectral mirroring operation or any other operation for generating a signal in the enhancement frequency range that is whitened before or after generation.

Figure 3:
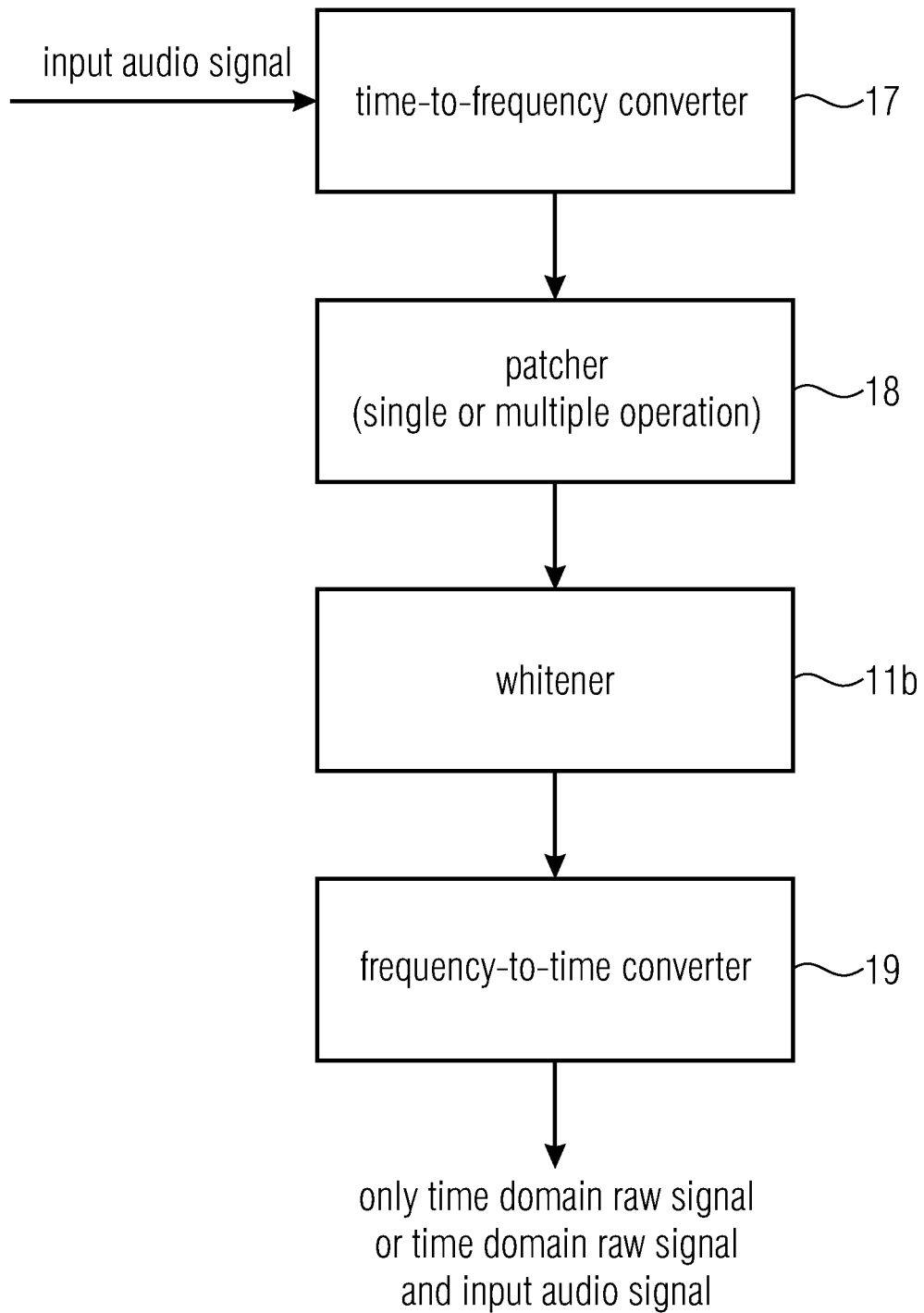
FIG. 3 is an advantageous implementation of the raw signal generator.

In an advantageous embodiment, the spectral whitening operation illustrated at 11b in FIG. 2b or illustrated at 11b in FIG. 3 comprises the procedures illustrated in FIG. 2c. A linear spectral frame as, for example, generated by the time-to-frequency converter 17 of FIG. 3 that can be an FFT processor, an MDCT processor or any other processor for converting a time domain representation in a spectral representation is input into a linear-to-power converter 13. The output of the linear-to-power converter 13 is a power spectrum. Block 13 can apply any power operation such as an operation with a power of 2, or 3 or, generally, a value between 1.5 and 4.5, although a value of 2 is Advantageous to obtain a power spectrum at the output of block 13. Then, a power frame is low-pass filtered over frequency by the low-pass filter to obtain the power spectral envelope estimate.

Then, in block 15, the power spectral envelope estimate is converted back to the linear domain using a power-to-linear converter 15, and the linear spectral envelope estimate is then input into a whitening calculator 16 that also receives the linear spectral frame in order to output the whitened spectral frame that corresponds to the raw signal or a raw signal spectral frame in an advantageous implementation.

Particularly, the linear spectral envelope estimate is a certain linear factor for each spectral value of the linear spectral frame and, therefore, each spectral value of the linear spectral frame is divided by its corresponding weighting factor included in the linear spectral envelope estimate output by block 15.

Advantageously, the low-pass filter 14 is an FIR filter having, for example, only 3, 4 or 5 taps or, at the most, 8 taps and, advantageously, at least 3 taps have the same value and are advantageously equal to 1 or even all 5 or, generally, all filter taps are equal to 1 in order to obtain a low-pass filter operation.

Figure 2E:
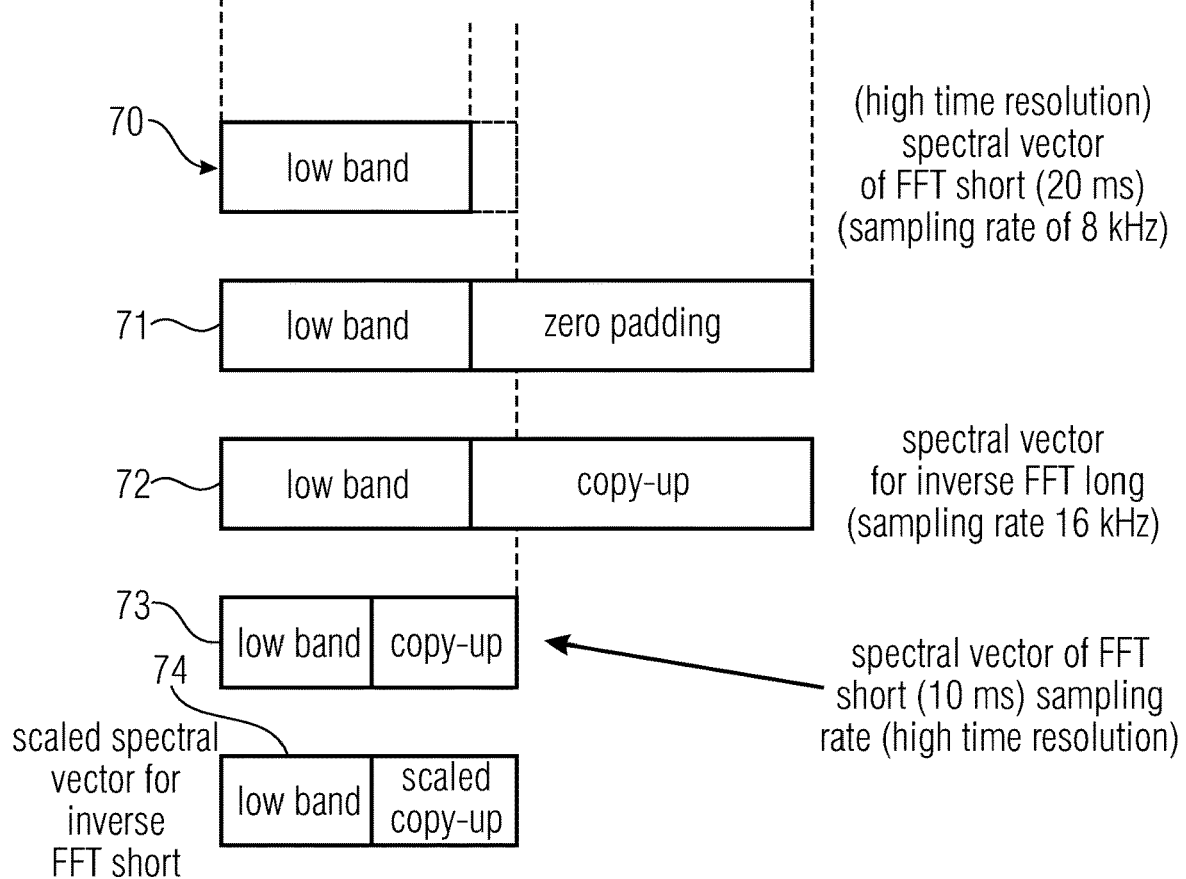
FIG. 2e illustrates spectral vectors used for the purpose of raw signal generation and used for the purpose of raw signal processing using the parametric representation output by the neural network processor.

FIG. 2e illustrates a processing performed in the context of the operation of the system in FIG. 4.

A basic acoustic model of the human speech production process combines a periodic, pulse-like excitation signal (the larynx signal) modulated by a transfer filter determined by the shape of the supralaryngeal vocal tract. Furthermore there are noise-like signals that result from turbulent air flow caused by constriction of the vocal tract or the lips. Based on this model the missing frequency range is extended by extending a spectrally flat excitation signal and then shaping it with an estimate of the vocal tract filter. FIG. 1 depicts the proposed system. From the decoded time-domain signal blocks of 20 ms are transformed by a DFT to the frequency domain. The frame increment (hop-size) of adjacent frames is 10 ms. In the frequency domain the signal is upsampled to 16 kHz by zero-padding and the missing frequency content above 3.4 kHz is generated in the same way as in bandwidth extensions like Intelligent Gap Filling (IGF) or SBR [12, 13]: the lower bins are copied-up to create the missing signal. Since codecs like AMR-NB only code frequencies between 200 and 3400 Hz this signal is not enough to fill the missing range of 8000-3200=4800 Hz. Therefore this operation has to be done twice—first time to fill the range of 3400 to 6600 Hz and another time to fill the range of 6600 to 8000 Hz.

This artificial generated signal is too tonal compared to the original excitation signal. A low complex method used in IGF is used to reduce the tonality [14]. The idea here is to divide the signal by its spectral envelope generated by FIR-filtering the power spectrum. This serves two purposes—first the formant structure is removed from the copied signal (this could also be achieved by using the LPC residual), second the ratio of the energy of the harmonics to the noise is lowered. Therefore this signal will sound much more natural.

After an inverse DFT of double the size of the initial DFT, the time-domain signal with 16 kHz sampling frequency is generated by overlap-adding blocks with 50% overlap. This time-domain signal with flat excitation signal above 3400 Hz will now be shaped to resemble the formant structure of the original signal. This is done in the frequency domain of a DFT with higher time-resolution operating on blocks of 10 ms. Here the signal in the range of 3400 to 8000 Hz is divided into 5 bands of roughly 1 bark width [15] and each DFT-bin $X_i$ inside band b is scaled by a scaling factor $f_b$:

$$\hat{X}_i = X_i \sqrt{f_b} \quad (1)$$

The scaling factor $f_b$ is the ratio of the logarithmic energy estimate $L_b$ and a sum or mean energy of the bins i in band b:

$$f_b = \frac{e^{L_b}}{\sum_j |X_j|^2}, \quad (2)$$

where j iterates over all bins inside band b. $L_b$ is calculated by a DNN explained in the next section and is an estimate of the true wide-band energies $\tilde{L}_b$:

$$\tilde{L}_b = \log \Sigma_j |\tilde{X}_j^2| \quad (3)$$

which is calculated on the spectrum of the original wide-band signal $\tilde{X}$.

Finally, the scaled spectrum $\hat{X}_i$ is converted to time-domain by an inverse DFT and the output signal is generated by overlap-adding previous frames with 50% overlap.

Thus, as illustrated in FIG. 4, the narrow band input audio signal 50 is input into a first time-to-frequency converter performing a "short" conversion or transform meaning that the spectral vector only has frequencies up to half the sampling rate, i.e., up to 8 kHz. The time window length is 20 ms or, generally, is a certain value. Since the useful spectrum only goes until 3.4 kHz, the upper portion of the spectral vector between 3.4 kHz and 4 kHz is unused as illustrated at 70. Then, a zero padding is performed to this spectral vector 70 in order to obtain spectral vector 71. Then, the zeroes in the zero padding section of the spectral vector 71 are filled with useful values by the copy-up procedure and, additionally, the spectral values in the copy-up section are spectrally whitened by block 11b in FIG. 4. Then, an inverse FFT is performed with the spectral vector 72. The conversion algorithm is a long conversion algorithm, since the number of values input into the conversion algorithm is two times the number of spectral values generated by the time-to-frequency conversion performed by block 17 of FIG. 4 illustrated by the spectral vector 70.

And, importantly, it is to be noted that the signal at the input into block 50 has a sampling rate of 8 kHz, for example, and the signal output by block 19 now has double the sampling rate, i.e., 16 kHz, but, now, the spectral range goes up to 8 kHz.

Now, the raw signal processor 20 performs a further time-to-frequency conversion, but with again a short algorithm kernel. Advantageously, the window length is 10 ms, so that, with respect to spectral vector 72, the now generated spectral vector 73 obtained by block 22 of FIG. 4 has a lower number of spectral values due to the shorter window length and the number of spectral values is again equal to what has been discussed with respect to spectral vector 70 apart from the range between 3.4 and 4 kHz.

Thus, with respect to the spectral vector 73, the number of low band spectral values is half with respect to the number of low band spectral values in block 72 and the number of high band values in block 73 is also half with respect to the number of high band values in block 72 illustrating the lower frequency resolution but higher time resolution.

Then, as illustrated at spectral vector 74, the copy-up range is scaled using the parametric representation from the neural network processor 30 and, particularly, from the deep neural network 31 within a scaling block 23 and, then, block 74 is converted back into the time domain again with the short kernel so that, in the end, wide band speech is obtained.

In all conversion operations be it FFT operations or MDCT operations, 50% overlap is performed. Thus, two 10 ms timeframes corresponding to spectral vectors 73 and 74 make up the same time range as a single spectral vector 70 at the low sampling rate or 71 and 72 at the high sampling rate.

It is Advantageous that the time length of a block processed by the conversion algorithm 22 or 24 is half the length of a block processed by processor 17 or 19 of FIG. 4 or, alternatively, the relation can be ⅓, ¼, ⅕, etc. Thus, the timeframes do not necessarily have to be 20 ms for the procedure in the raw signal generator and 10 ms for the procedure in the raw signal processor 20. Instead, when, for example, the raw signal processor 10 would use 10 ms, then the raw signal processor 20 would use 5 ms or, when the raw signal generator 10 would use 40 ms, then the raw signal processor 20 could use 20 ms, 10 ms, or 5 ms, for example.

Furthermore, it is to be noted with respect to FIG. 4, that the low band of the output of the converter 22 is input into the neural network 31 and the high band is forwarded to the scaler 23 and the inverse frequency-time converter 24 would nevertheless combine the low band that has also been input into block 31 and the high band at the output of the scaler 23 as illustrated in FIG. 2e. Naturally, the low band for the DNN processor 31 could also come from the output of block 17 or could come directly from the input 50. In general, it is only useful that not the specific input audio signal as input into the raw signal generator is input into the neural network processor, but it is only useful that the input audio signal frequency range of the input audio signal irrespective of whether it is in the low sampling rate or in the high sampling rate is input into the neural network processor, although it is advantageous that, in the FIG. 4 embodiment, the high sampling rate input audio signal frequency range is input into the neural network processor 31 as the "low band" illustrated in FIG. 4.

Figure 6:
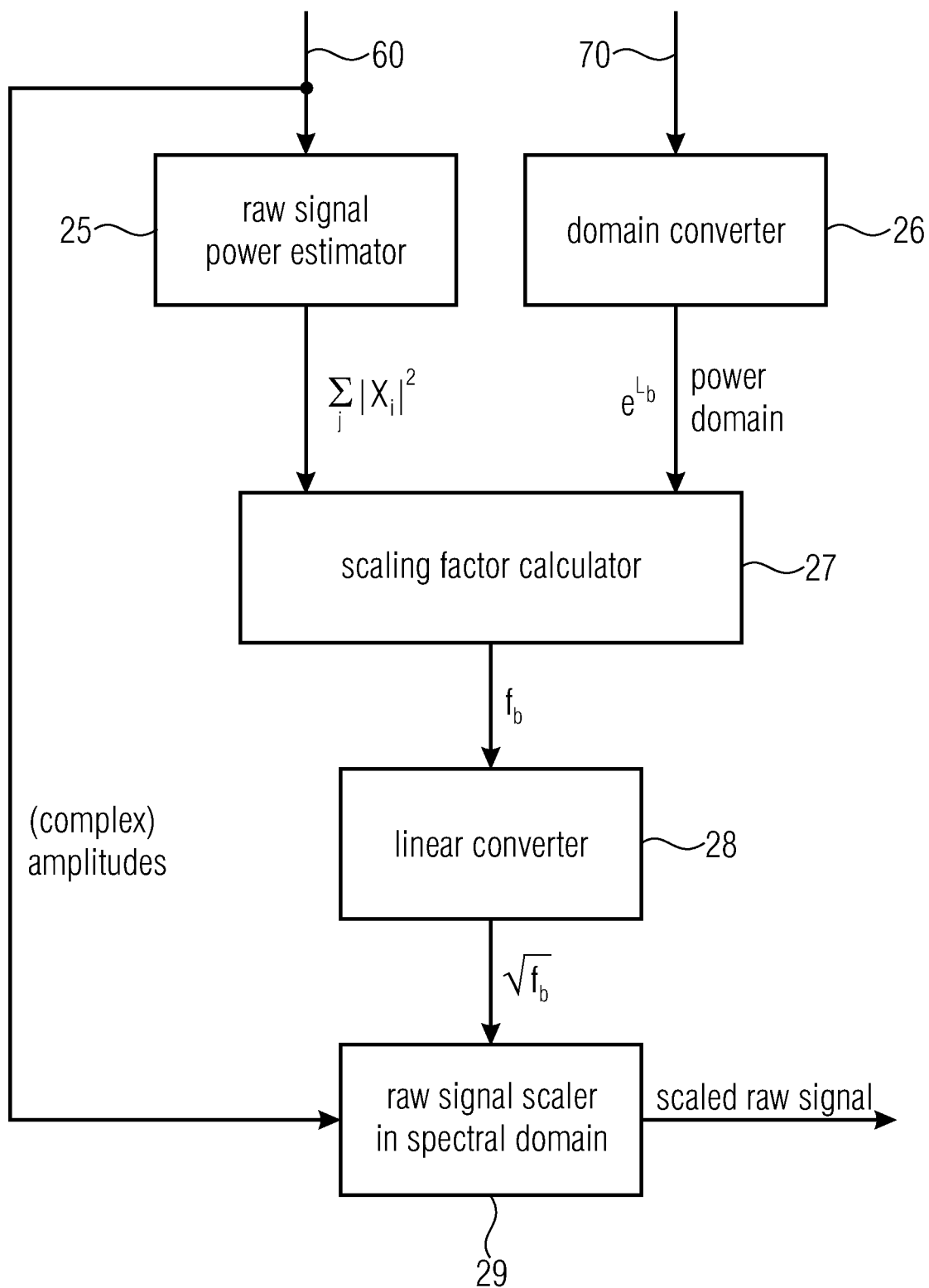
FIG. 6 is an advantageous embodiment of the raw signal processor.

FIG. 6 illustrates an advantageous implementation of the raw signal processor 20. The raw signal processor comprises a raw signal power estimator 25 receiving the raw signal from the raw signal generator 10. The raw signal power estimator then estimates the power of the raw signal and forwards this estimate to a scaling factor calculator 27. The scaling factor 27 is additionally connected to a domain converter 26 for converting the parametric data such as the estimate for an energy in the certain band of the wide band signal provided by the neural network processor from the log or $(\ )^{1/3}$ domain into the power domain. Then, the scaling factor calculator 27 calculates, for each band, a scaling factor $f_b$ and this value is converted into a linear domain by the linear converter 28, and, then, the real or complex-valued amplitudes of the raw signal 60 are scaled by the raw signal scaler operating in the spectral domain as illustrated at block 29 using the scaling factor. Thus, when, for example, there are five real or complex amplitudes in a band, then all those five amplitudes are scaled by the same linear scaling factor generated by block 28, and this scaling is done in block 29 to obtain to scaled raw signal at the output of block 29. Thus, in a certain embodiment, the scaling factor calculator 27 performs the calculation of Eq. (2), and the raw signal scaler 29 performs the operation in Eq. (1) in a certain embodiment. The domain converter 26 operation is performed by the exponential function in the numerator in Eq. (2) above, and the raw signal power estimation performed by block 25 is done in the denominator of above Eq. (2).

It is to be noted that FIG. 6 only illustrates a schematic sketch, and it is clear for those skilled in the art that, as already discussed with respect to Eq. (2), the functionalities of the blocks 25, 26, 27 can be performed within a single calculation operation illustrated by Eq. (2). At the same time, the functionalities of blocks 28 and 29 can be performed within a single calculation as illustrated with respect to above Eq. (1).

Figure 5:
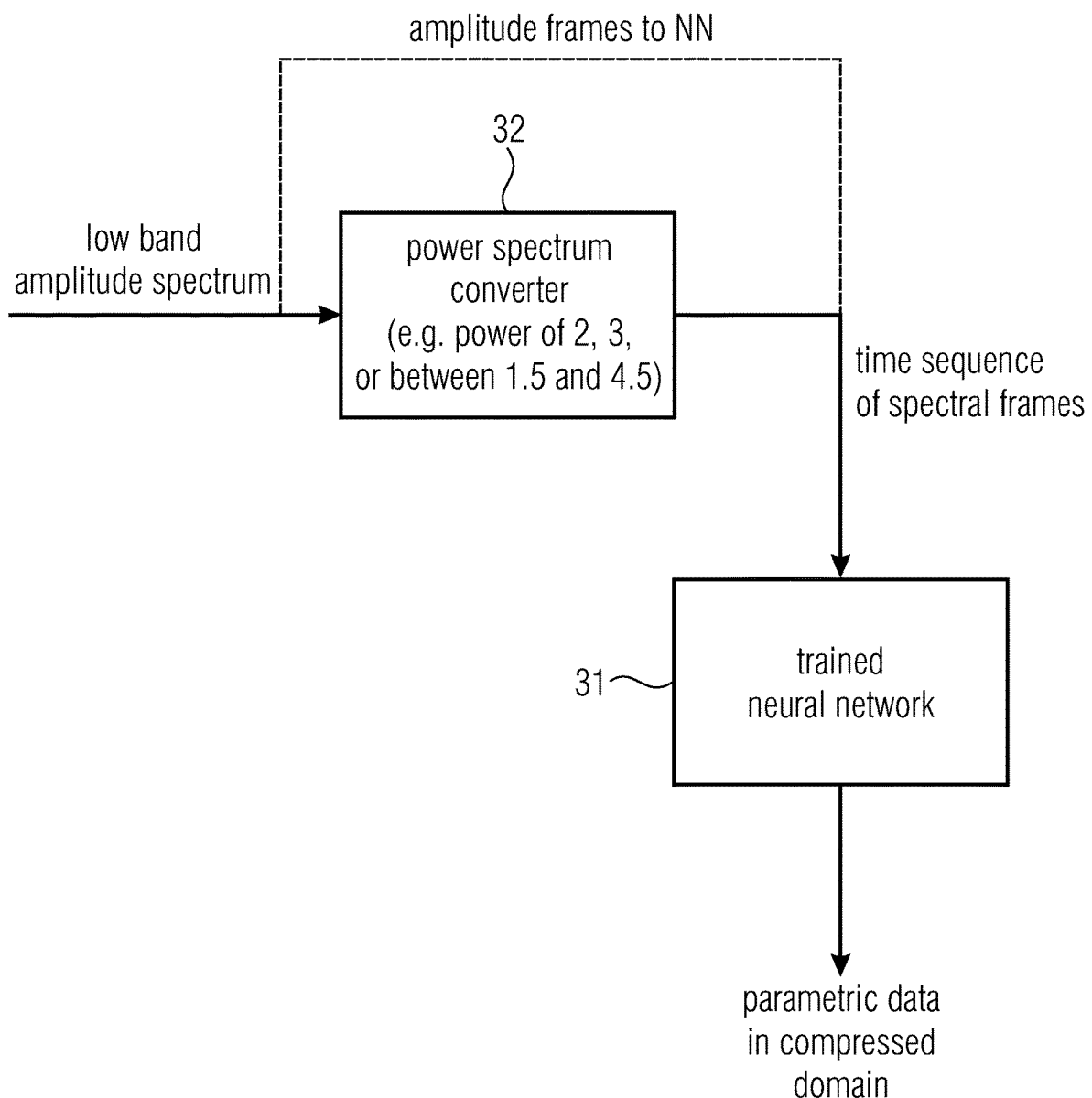
FIG. 5 is an advantageous embodiment of the neural network processor.
Figure 7:
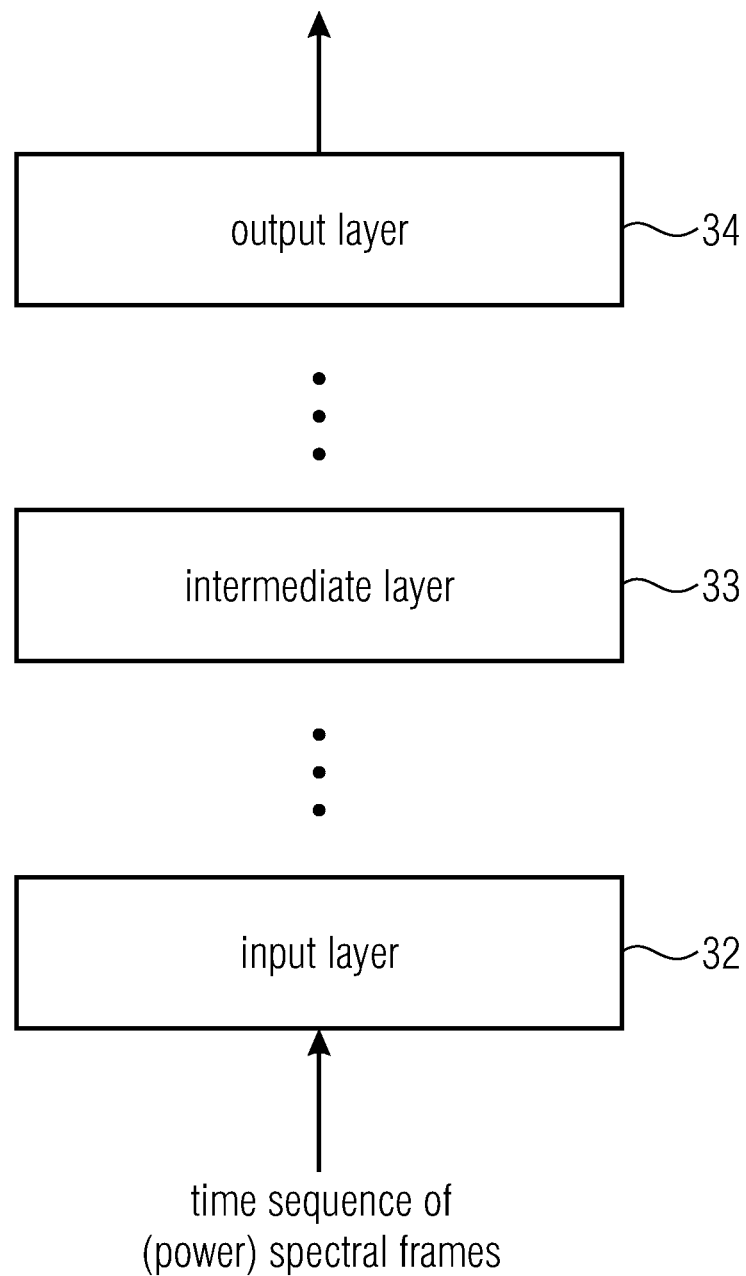
FIG. 7 is an advantageous layout of the neural network.

FIG. 7 illustrates an advantageous implementation of the neural network as used in the neural network processor 30 of FIG. 1 and, particularly, as used in block 31 of FIG. 5. Advantageously, the neural network comprises an input layer 32 and an output layer 34 and, in certain embodiments, one or more intermediate layers 33. Particularly, the neural network processor 30 is configured to receive, at the input layer 32, a spectrogram derived from the input audio signal, the spectrogram comprising a time sequence of spectral frames, where a spectral frame has a number of spectral values and the neural network outputs, at the output layer, individual parameters of the parametric representation 70. Particularly, the spectral values input into the input layer 32 are linear spectral values or, advantageously, power spectral values processed using a power between 1.5 and 4.5 and, advantageously, a power of 2 (power domain) or a power of 3 (loudness domain), or most advantageously processed power spectral values processed using a power between 1.5 and 4.5 and, advantageously, a power of 2 (power domain) or a power of 3 (loudness domain), and then processed using a compression function such as a log function, or a $(\ )^{1/3}$ function or generally a function having a power lower than 1.0 to have values in the loudness or compressed domain. If the linear spectral values are given in real/imaginary (real+j imag) representation, then an advantageous processing for obtaining a processed power spectral value would be log (real$^2$+imag$^2$) or (real$^2$+imag$^2$)$^{1/3}$.

Figure 9A:
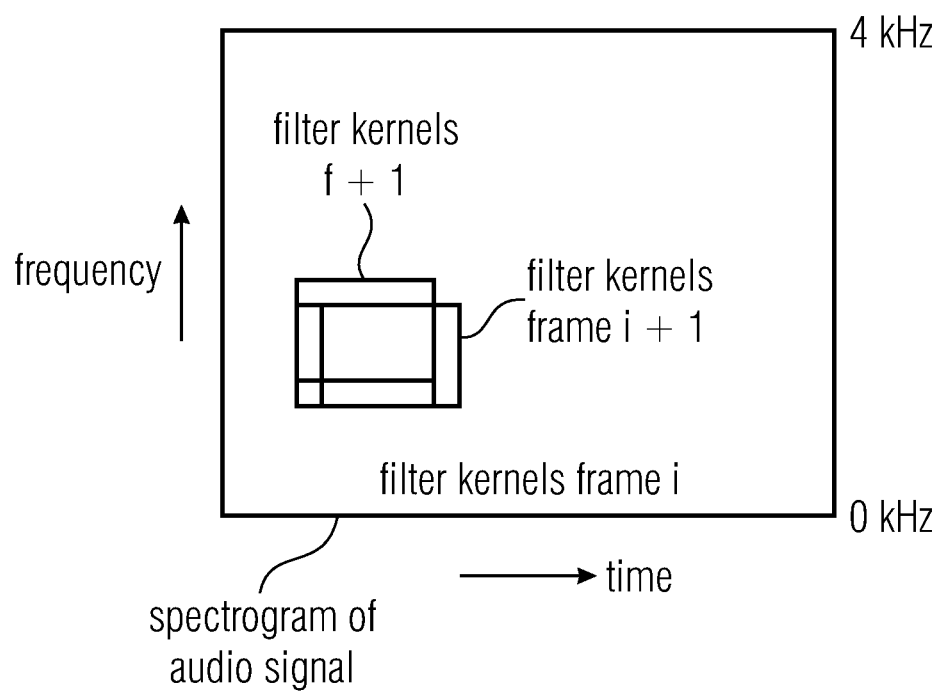
FIG. 9a illustrates a principle of a convolutional layer.
Figure 9B:
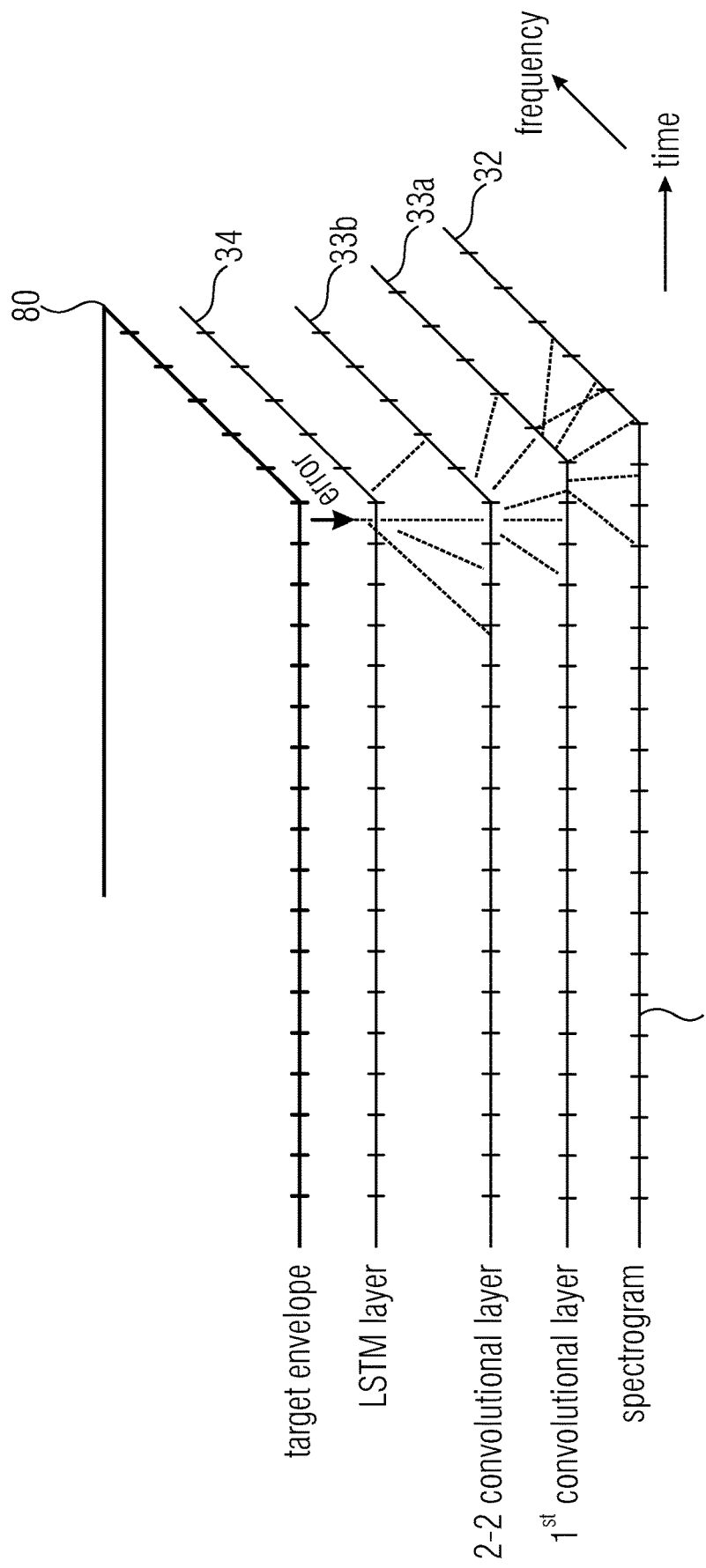
FIG. 9b illustrates a neural network using several convolutional layers and an LSTM layer.

In a certain embodiment, for example illustrated in FIG. 9a or 9b, the input layer only or the input layer and one or more intermediate layers comprises a convolutional layer, and the convolutional layer comprises one or more convolutional filter kernels where two are illustrated in FIG. 9a. Particularly, in FIG. 9a, the spectrogram of the audio signal is illustrated in a two-dimensional form where the time goes from left to right and the frequency goes from top to bottom.

A filter kernel for frame i is illustrated as the basic square and a filter kernel for frame i+1 is illustrated at the right-hand square and a filter kernel for the frequency f+1 is illustrated at the upper small square.

The individual convolutional layers for the basic layer are the first, and the second layer 33a, 33b, are illustrated as well, and, in this embodiment, the convolutional layers are followed by at least one recurrent layer such as the LSTM layer 34. This layer, in this situation, already represents the output layer 34.

Furthermore, FIG. 9b illustrates the training situation, where the target envelope, in this implementation, or generally, the spectral representation is illustrated at 80, and the error between the target envelope and the envelope estimates done by the output layer 34 is used for enhancing the training success by minimizing this error.

Figure 10:
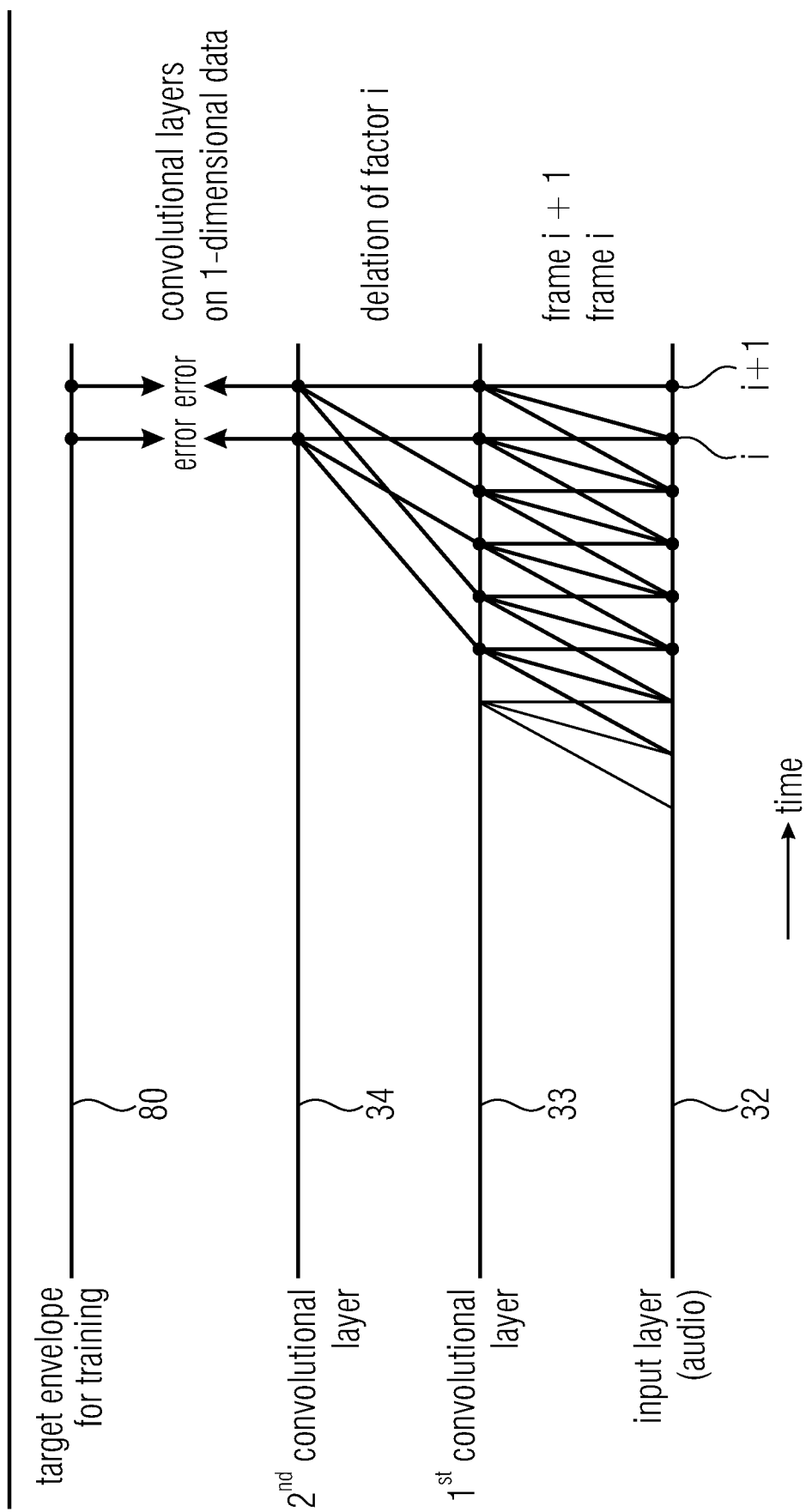
FIG. 10 illustrates a neural network only using convolutional layers with a delation of factor i.

FIG. 10 illustrates a further neural network. The neural network in FIG. 10 is different from the neural network in FIG. 9b in that the output layer 34 is a convolutional layer and, in the embodiment of FIG. 10, the second convolution layer.

Furthermore, the input layer 32 is, as already discussed with respect to FIG. 9b, the layer receiving the spectrogram and the input layer data is processed by one or more convolutional kernels operating for producing the output results of the first convolutional layer 33. The second convolutional layer 34 that is, at the same time, the output layer 34 in FIG. 10 performs a delation of factor i. This means that, for example, the data for the time index i+1 in the second convolutional layer 34 is calculated using the data for i+1 of the first convolutional layer 32, and the data for i−1 and i−3.

Correspondingly, the data for time index i for the second convolutional layer 34 is calculated from the data for time index i for the first convolutional layer, the data for time index i−1 for the first convolutional layer and the data for i−4 for the first convolutional layer. Thus, certain results of the first convolutional layer are downsampled when calculating the second convolutional layer but, typically, all data from the first convolutional layer is, finally, used for calculating certain data in the second convolutional layer due to the interleaved processing discussed and illustrated in FIG. 10.

It is to be noted that FIG. 10 only illustrates the time index, but the frequency index or frequency dimension is not illustrated in FIG. 10. The frequency dimension goes into the plane of FIG. 10 or goes out of the plane of FIG. 10. With respect to frequency processing, a reduction of dimension from layer to layer can also be performed so that, in the end, i.e., for the highest convolutional layer or output layer, only the set of parameters occur that are compared to the target parameters in order to minimize the error as illustrated at the top of FIG. 10 at layer 80 illustrating the target envelope for training or, generally, illustrating the target spectral representation for training purposes.

Figure 11:
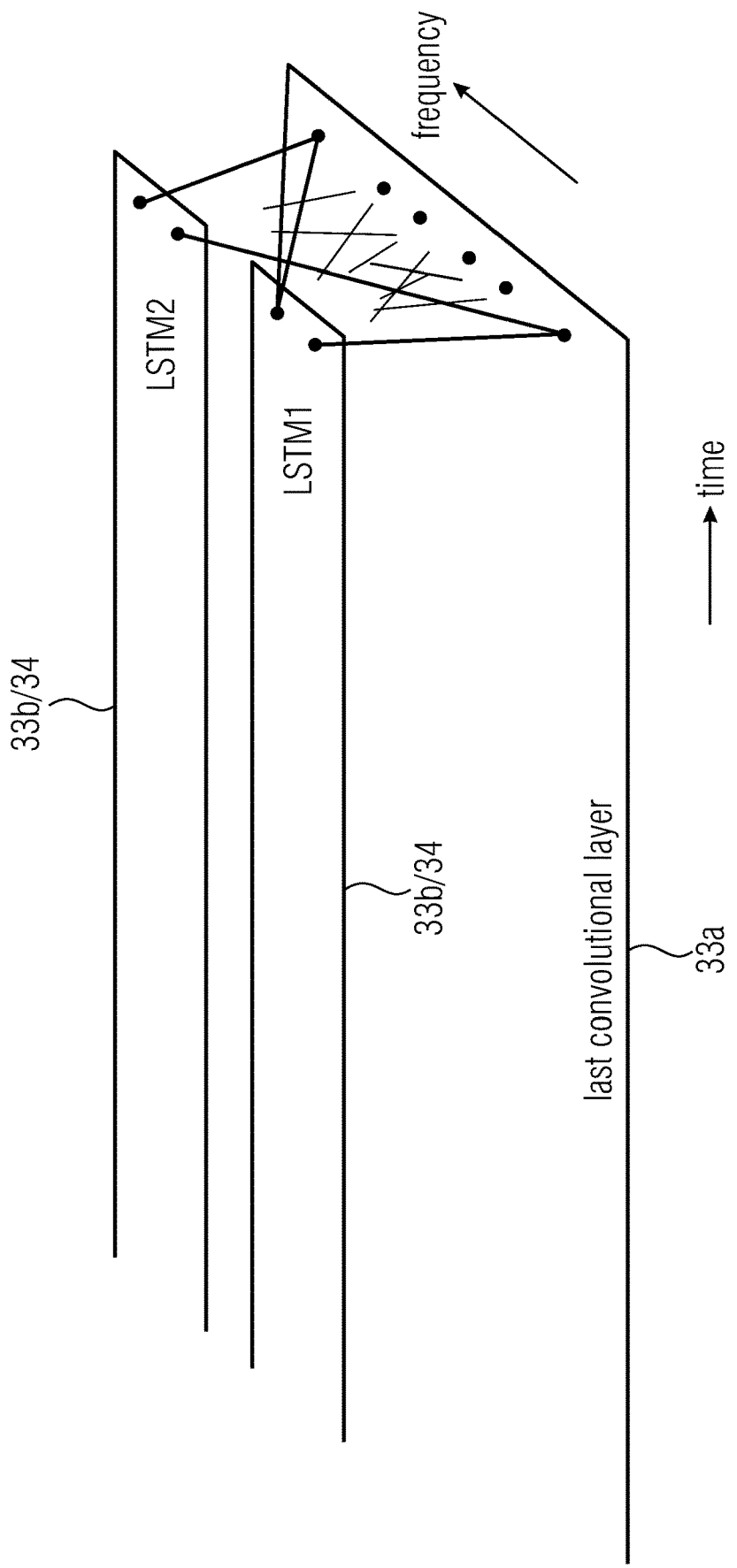
FIG. 11 illustrates the application of two LSTM layers applied on top of a convolutional layer.

FIG. 11 illustrates a combination between a highest or "last" convolutional layer 33a and a subsequent LSTM layer with two different LSTM cells. Thus, FIG. 11 illustrates a situation, how an LSTM layer looks like, when two LSTM cells LSTM1, LSTM2 are used. Thus, it becomes clear that the dimension of the LSTM layer becomes greater compared to only having a single LSTM cell.

In an embodiment, a recurrent layer processor operating within a recurrent layer is implemented as an IIR filter. The filter coefficients of the IIR filter are determined by the training of the neural network, and the past situation of the input audio signal is reflected by the memory states of the IIR filter. Thus, due to the IIR (infinite impulse response) nature of the recurrent processor, information ranging deeply into the past, i.e., information from a spectral frame being, for example, thirty seconds or even one minute before the current frame nevertheless influence the current situation.

Figure 12:
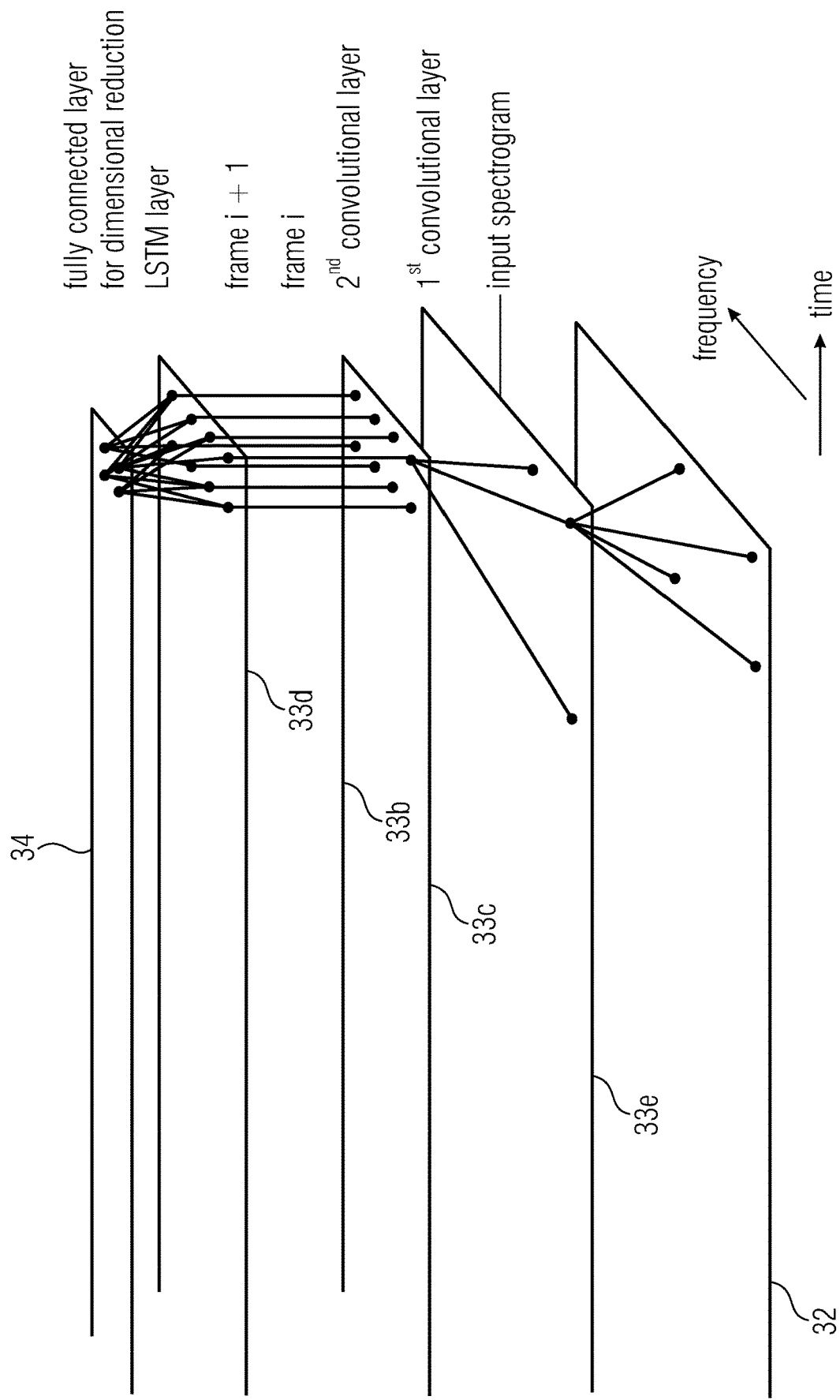
FIG. 12 illustrates a further Advantageous neural network using convolutional layers and at least one LSTM layer and, finally, a fully connected layer for dimensional reduction is the output layer of the neural network.
Figure 13:
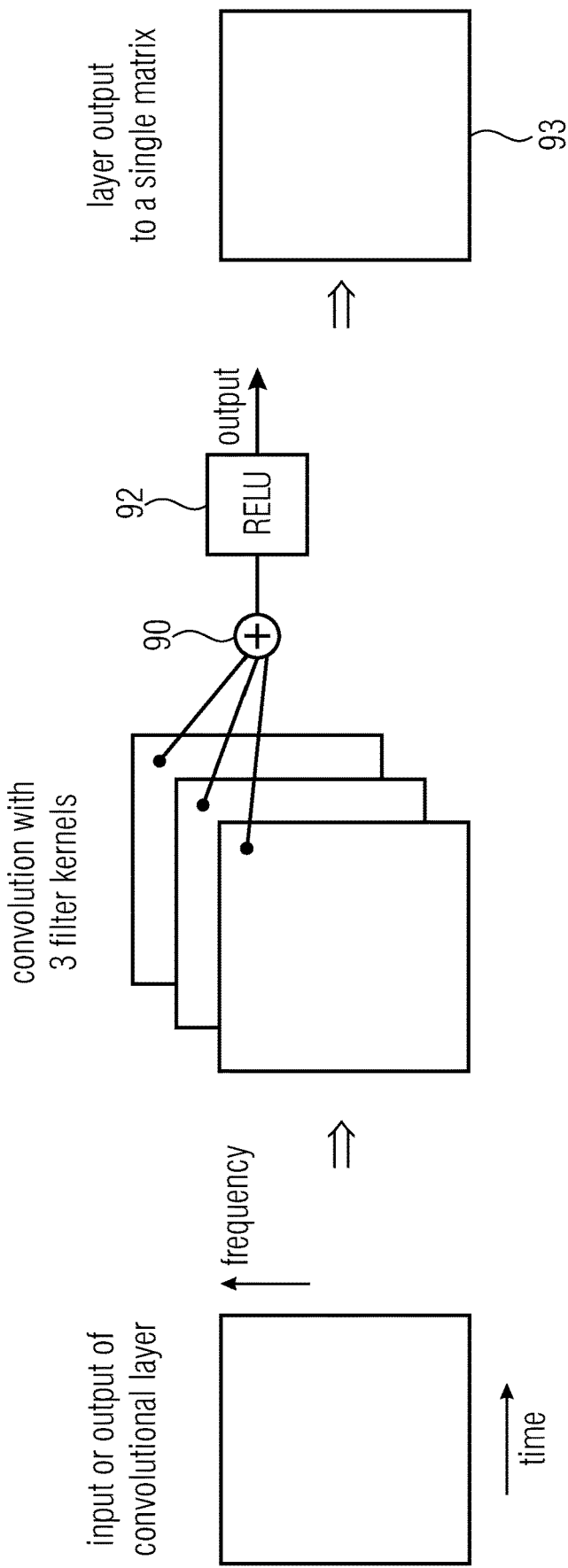
FIG. 13 illustrates an application of a convolutional layer with three filter kernels.

FIG. 12 illustrates a further embodiment of a neural network consisting of an input layer 32, two convolutional layers 33a, 33b and a higher LSTM layer 33d. However, in contrast to earlier described neural networks, the output layer is a fully connected layer for performing the dimension reduction, i.e., for reducing the two-dimensional high dimension from the input layer 32 into a low dimension, i.e., a low number of parameters of the parametric representation per time frame. Furthermore, FIG. 13 illustrates the case, where the two-dimensional input or output of a convolutional layer is processed by, for example, three convolution filter kernels. In this case, one receives, for each layer, several matrices that are, in the end, added together by an added 90 and, subsequently, the result is input into a function such as the RELU function 92 to once again generate a single output matrix illustrated at 93 showing a layer output compacted to a single matrix by the sample wise adding operation of adder 90 and, for each operation or additional result, the subsequent functional procedure by functional operator 92. Naturally, the functional operator 92 can be any other operated different from RELU as known in the art of neural network processing.

The target energy estimate $L_b$ in equation 2 in section 2 scales the spectrum of the synthesized signal to approximate the energy of the original signal. This value is calculated by a DNN. The input to the DNN are concatenated frames of the lower band power spectrum. This is different to state-of-the-art methods where the input are features like Mel Frequency Cepstral Coefficients. Instead the first DNN layers are convolutional layers (CNN) followed by LSTM layers and a final fully connected layer with linear activation functions.

CNNs are a variation of multilayer perceptrons inspired by the organization of receptive fields in eyes. A CNN layer is a layer of filter kernels with the kernel coefficients learned during training [16]. CNNs exploit local dependencies much better and with fewer trainable coefficients than fully connected layers. The dimension of the filter kernel is in principle arbitrary but should not exceed the dimension of the input data. Here two-dimensional filter kernels are convolved with the input spectrogram in time and frequency dimension. These filters are able to detect abstract pattern in the signal similar to features like a spectral centroid or Mel Frequency Cepstral Coefficients.

The convolutional layers are followed by recurrent layers. Recurrent layers are suited to learn longer time-dependencies. There are different types of recurrent layers and here LSTM-layers showed the best performance. LSTMS are able to exploit short as well as long time structure [17]. Similar but slightly less performance could be achieved with layers of gated recurrent units (GRU) [18].

The last layer of the network is a fully connected layer with linear output function. The linear output function allows the network to output unlimited continuous values.

The DNN is trained in a supervised manner by minimizing the difference between the energies of the true wide-band spectrum $L_b$ and the per iteration estimate $L_b$. For this a variant of the mini-batch stochastic gradient descent algorithm (SGD) called Adagrad [19] was used. Like in standard SGD the networks parameters are iteratively updated until a local minimum of a predefined loss-function is reached but no learning rate has to be tuned by hand.

An important aspect is the definition of the loss function. Since the system will ultimately be judged by human listeners a perceptual motivated loss is beneficial. Furthermore the training shall be done with deep learning libraries like Keras [20] and for this reason the loss and its derivative may be able to be calculated efficiently on CPUs or GPUs. In this work the logarithm in equation 3 implements a coarse loudness model. The advantage of this is that the error function reduces to the Euclidian distance. Replacing the logarithm in equation 3 by ( )⅓ has also been tried but informal listening didn't show any benefits.

Another important aspect is the algorithmic delay of the DNN since the presented system should be used in real-time applications. Because the DNN operates on concatenated frames with a frame increment of one frame the main source of delay comes from the first convolutional layer. In favor of keeping the delay as low as possible the time-dimension of the kernel was set to three—meaning a kernel covers three frames. Since the DNN operates on shorter frames than the upsampling and excitation generation in 2 the convolutional layer doesn't add additional algorithmic delay. In frequency direction the kernels cover 250 Hz. Other kernel sizes have been tested but didn't improve the performance.

One important aspect of training a DNN is the versatility of the training set. In order to build a model that is large enough to model the highly non-linear characteristics of the vocal tract the training set needs to be large and contain a vast variety of data—namely different speakers with different languages all of this recorded with different recording gear in different rooms. The 400 minutes long training set has been compiled from several public accessible speech corpora [21] as well as in-house recordings. The training set contains native spoken speech including the following languages: native American English, Arabic, Chinese (Mandarin), Dutch, English (British), Finnish, French, German, Greek, Hungarian, Italian, Japanese, Korean, Polish, Portuguese (Brazilian), Russian, Spanish (Castilian), Swedish.

The evaluation set neither contains a speaker from the training set nor a recording setup used in the training set and is 8 minutes long.

Furthermore, an additional description of the neural network processing is given subsequently.

The first convolutional layer input is a spectrogram matrix S[t, f] with t being time index and f being frequency index. S is convolved with filter-kernels k with predefined kernels-size—e.g., 3×2. The convolution of S with a single filter-kernel creates a new matrix C. One entry of C is the result of the vector product of:

$$C_{t,f} = \sigma\{\Sigma_{i=1}^{3}\Sigma_{j=1}^{2}S_{t+i-1,f+j-1}k_{[i,j]}\}, \quad (4)$$

wherein sigma is some kind of non-linear function, e.g. RELU. Since no padding is used, the dimension of the matrix C is reduced depending on the size of the filter kernel.

The second and following convolutional layers operate as the first convolutional layer with the difference that the convolution operation is a delated convolution. The input for a delated convolution is a downsampled version of the previous layer. In mathematical terms:

$$C_{t,f} = \sigma\{\Sigma_{i=1}^{3}\Sigma_{j=1}^{2}S_{t+n,i-1,f+j-1}k_{[i,j]}\}, \quad (5)$$

with n, m being positive integer values like 2, 3 . . . etc. In case n, m being 1, the convolution operating is a simple convolution operation.

FIG. 10 shows an example of the delated convolution operation with a one-dimensional signal. Important is the processing of two following audio frames i and i+1. This processing assures a low-delay processing needed for real-time audio operation.

The convolution described in the previous sections can be seen as a transformation F of S:

$$\text{out} = \sigma\{F_{(input)}\} \quad (6)$$

Adding residual connections changes Eq. (4) by just adding a bypass of the input:

$$\text{out} = \sigma\{\text{input} + F_{(input)}\} \quad (7)$$

The advantage of the bypass is that the network performs much better after training as described in Kaiming He: Deep Residual Learning for Image Recognition, 2015.

The LTSM/GRU layer operates in a very simple manner, taking the output vector of a convolution layer for a single frame as input while creating an output vector of the same dimension:

$$\text{Out}_t = \text{LSTM}\{C_t\}, \quad (8)$$

$$\text{Out}_{t+1} = \text{LSTM}\{C_{t+1}\} \quad (9)$$

Subsequently, the processing of a single audio frame in an embodiment will be described.

A single audio frame is processed by:
performing the convolution operation of the first layer based on the spectrogram of the current frame and the previous frames
performing the delated convolution operation of the next layers based on the output of the previous layers
the per frame output of the last convolutional layer is a one-dimensional vector being input to the recurrent (LSTM, GRU) layer
the output of the LSTM/GRU layer being the estimate of the envelope of the missing signal or, alternatively, being input to one or more fully connected layers which finally output the envelope of the missing signal.

In that way, the algorithmic delay of the whole structure is only a single audio frame.

It shall be emphasized that other DNN structures such as simple fully connected layers may be trained to perform similar, but not with a complexity as low as the presented system.

There are two variants of DNNs used for predicting the signal. The first one is not described in the above-mentioned paper and is a temporal convolutional network (TNC) as described in S. Bai et. Al.: An Empirical Evaluation of Generic Convolutional and Recurrent Networks for Sequence Modeling. This network is a convolutional network with delation and residual connections.

The second variant is a DNN comprising one or more convolutional layers followed by one or more recurrent layers—like LTSM or GRU. The first layer(s) optionally being one or more convolutional layer(s). The activation function of the output layer (last layer) being able to represent the value range of the estimated parameter (e.g., a linear function for estimating values of unlimited range or a RELU function for positive values). The DNN being trained with back propagation or some variant (ADA grad ADAM etc.) and the error being the per-iteration distance to the original signal.

Figure 8A:
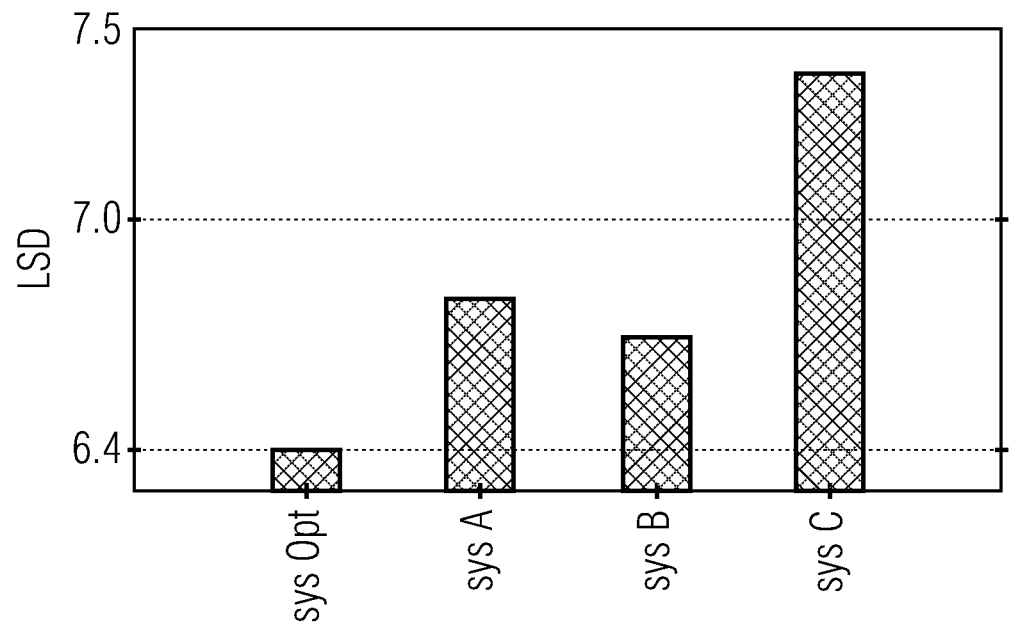
FIG. 8a is a sketch comparing the performance of different DNN configurations.

Subsequently, an evaluation will be given for a different system. To this end, FIG. 8a compares the performance of different DNN configurations. System OPT (the optimum system among the tested systems) has 2 convolutional layers (4 kernels) followed by 2 LSTM layers (16 units each). System A has a single CNN layer (4 kernels) and a single LSTM layer (16 units). System B has no CNN layer but 2 LSTM layers (32 and 16 units). System C has 2 CNN layers (4 kernels each).

Figure 8B:
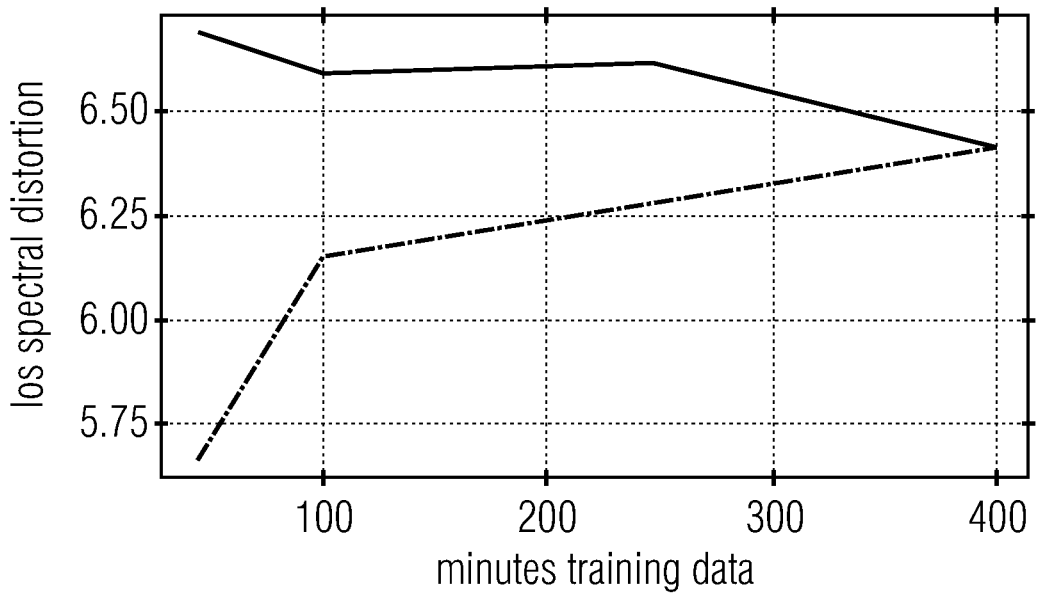
FIG. 8b is an illustration showing an error on training set and test set dependent on amount of data.

FIG. 8b illustrates the error on the training set (dashed line) and the test set (solid line) dependent on amount of data. With few training data (100 minutes or less), strong over-fitting occurs. With a training set of more than 400 minutes, over-fitting is eliminated.

Figure 8C:
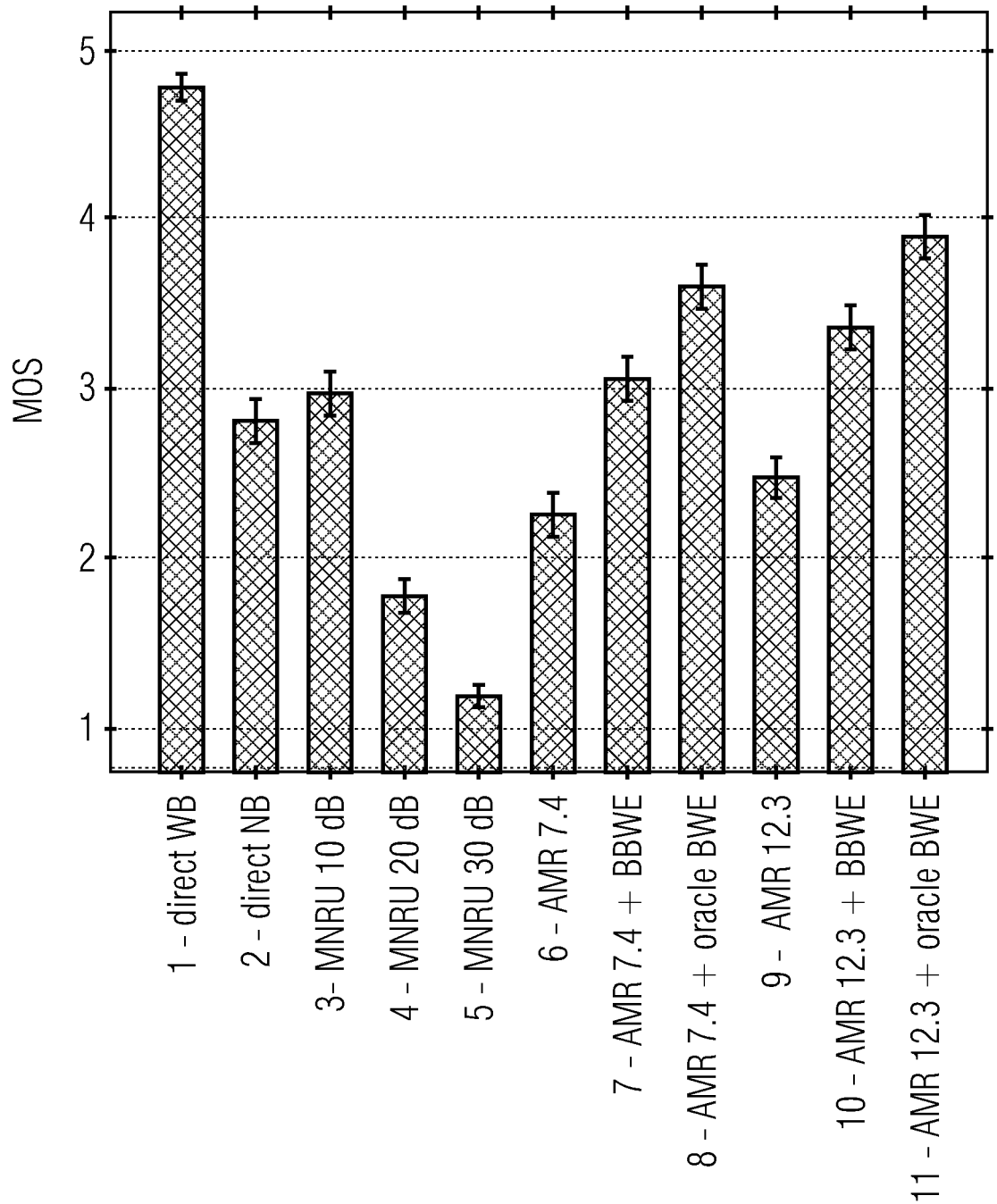
FIG. 8c illustrates results from the ACR listening test displayed as MOS values.

FIG. 8c illustrates the results from the ACR listening test displayed as MOS values with 94% confidence intervals. The codecs under test are—from left to right—1) direct white-band, 2) direct narrow-band, 3-5) MNRU 10-30 dB noise, 6) AMR-NB 7.4 kbps, 7) AMR-NB 7.4 kbps with blind band with extension, 8) AMR-NB 7.4 kbps with oracle BWE, 9) AMR-NB 12.2 kbps; 10) AMR-NB 12.2 kbps with BBWE, 10) AMR-NB 12.2 kbps with oracle BWE.

The presented system was evaluated by objective and subjective tests. First the structure of the network was optimized by maximizing Logarithmic Spectral Distortion or LSD. LSD is a well-known measure used in most publications regarding quantization of Linear Prediction Coefficients and correlates well with subjective perception:

$$LSD = \frac{1}{M}\sum_{i=0}^{M-1}\sqrt{\frac{1}{N}\sum_{j=0}^{N-1}\left(10\log_{10}|X_j| - 10\log_{10}|\tilde{X}_j|\right)^2}, \quad (10)$$

where $\tilde{X}$ is the upper band spectrum of the original signal, X is the upper band spectrum of the predicted signal and N is the number of bins in the upper band. M is the number of frames used for the evaluation.

FIG. 8a compares the performance of different DNN configurations. The best performing system (Opt) has two convolutional layers with 4 filter per layer, followed by 2 LSTM layers with 16 units each layer. System A has a single CNN layer with 4 kernels and a single LSTM layer with 16 units. System B has no CNN layer at all but two LSTM layers (32, and 16 units). System C has two CNN layers (4 filter kernels per layer) and no LSTM layer. Here it shows that LSTM layers have the biggest influence on the performance. A system with no LSTM layer performs much worse than a system with LSTM layer. The influence of the convolutional layer on the performance is less—a system without a convolutional layer still performs only 0.5 dB worse than the best system.

FIG. 8b shows the influence of the amount of training data on the performance. Small training sets may lead to models that perform very well on the training set but not on unknown data. Here it shows that a training set of 400 and more minutes is enough to create a model with almost no overfitting. Of course this may not be generalized to models with much higher capacity.

Table 1 evaluates the performance of a training and test set mismatch—one being coded with AMR-NB, the other one being uncoded. The left column shows the performance of the DNN trained on speech coded with AMR-NB, the right column shows the performance of a DNN trained on uncoded speech. In the upper row the test set was coded with AMR-NB, in the lower row the test set was uncoded. Apparently a DNN trained on speech coded with AMRNB performs better in a situation where the system would be applied to uncoded speech than vice versa. In addition AMR-NB degrades the performance of almost half a dB.

|  | DNN AMR-NB | DNN uncoded |
| --- | --- | --- |
| test set AMR-NB | 6.4 | 7.8 |
| test set uncoded | 7.5 | 6.0 |

The above table shows the performance of the DNN being trained with speech coded with AMR-NB (left column) or with uncoded speech (right column) evaluated on test sets being coded with AMR-NB (upper row) or uncoded (lower row). Performance shown as log spectral distortion (LSD).

FIG. 8c shows the results form the ACR listening test displayed as MOS values with 95% confidence intervals. The codecs under test are—from left to right—1) direct wide-band 2) direct narrow-band 3-5) MNRU 10-30 dB noise 6) AMR-NB 7.4 kbps 7) AMR-NB 7.4 kbps with blind bandwidth extension 8) AMR-NB 7.4 kbps with oracle BWE 9) AMR-NB 12.2 kbps 10) AMR-NB 12.2 kbps with BBWE 10) AMR-NB 12.2 kbps with oracle BWE.

Finally the presented system was evaluated with a listening test with the same test method as in [4]. The test is an Absolute Category Rating (ACR) test [22] where a stimulus is presented to a listener without any reference. The listener rates the stimulus on a scale from 1 to 5 (Mean Opinion Score, MOS). 29 unexperienced listeners participated in the test and the test material were 30 recordings of both female and male speech without background noise. Each recording contains a sentence pair and was 8 s long. Each condition was tested with 6 different speech files from 3 female and 3 male speakers. Before the main test started, six speech files of different processing conditions and speakers were presented to the participants in order to accustom them to the range of qualities to be experienced in the test.

The results from the test are presented in FIG. 4 displayed as average MOS-values with 95% confidence intervals. The direct WB condition achieved the highest ratings of 4.8 MOS while the direct NB condition achieved 2.8 MOS. Next are the Modulated Noise Reference Units (MNRU) [23] which is speech degraded by modulated noise (sampled at 16 kHz). They serve as quality anchor and make the test comparable to other tests. Finally the results of AMR-NB, AMR-NB with the presented blind bandwidth extension and AMRNB with an oracle bandwidth extension are shown at two different bitrates—7.4 kbps and 12.2 kbps. The oracle system differs from the presented system by scaling the spectrum to reach the energy of the original. This is done by replacing the DNN estimate $L_b$ in equation 2 by $L_b$ calculated on the original WB spectrum. This system is an upper bound of quality a bandwidth extension could reach.

The results show that presented bandwidth extension works well by improving the quality of AMR-NB by 0.8 MOS (7 kbps) to 0.9 MOS (12.2 kbps). The BBWE at 12.2 kbps is also significant better than the direct NB condition. Nevertheless there is still lot of space for improvement as the results from the oracle BWE show.

A blind bandwidth extension was presented that is able to improve the quality of AMR-NB by 0.8-0.9 MOS. It does not add additional algorithmic delay to AMR-NB. The complexity is also moderate so it can be implemented on mobile devices. The system can be easily adopted to different core codecs and reconfigured to different bandwidth settings.

The advantages of certain embodiments of the proposed system are:
 no additional algorithmic delay if the core coder operates on frames of 10 ms or longer
 the DNN structure is of low complexity
 the combination of convolutional and recurrent layers or TNC layers is a good predictor of the missing signal. Thus the perceived quality of the system is increased compared to state of the art blind bandwidth extensions. It shall be emphasized that other DNN structures such as simple fully connected layers may be trained to perform similar but not with a complexity as low as the presented system.

Although the present invention can be applied as a fully blind bandwidth extension for all kinds of audio data such as speech data, music data or general audio data, other use cases exist, which are of particular usefulness.

Figure 14:
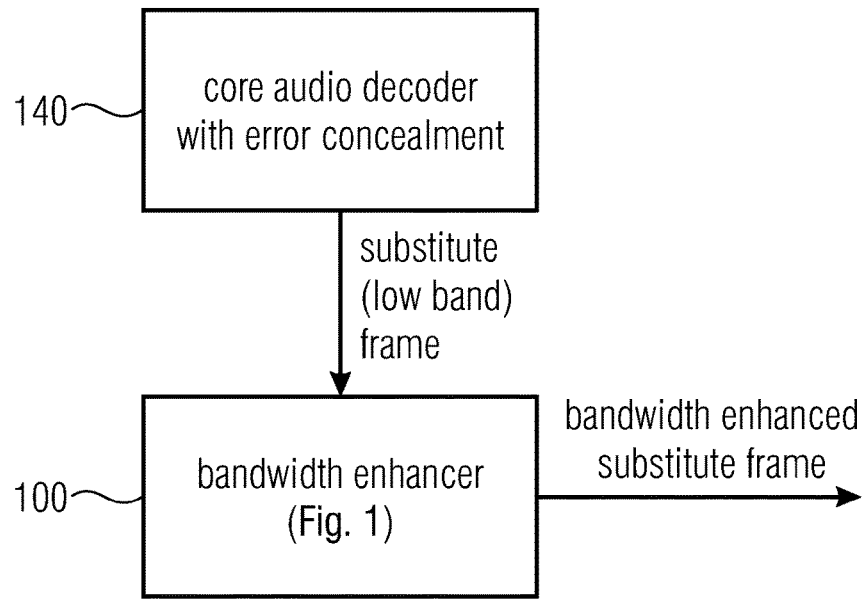
FIG. 14 illustrates an applicational system for the application of the FIG. 1 embodiment for the purpose of error concealment.

One useful application is a system for processing an audio signal as illustrated in FIG. 14. The system of FIG. 14 comprises a core audio decoder 140 for decoding a core audio signal organized in frames, wherein the core audio decoder is configured for detecting an error situation indicating a frame loss or an erroneous frame.

Furthermore, the core audio decoder is configured to perform an error concealment operation to obtain a substitute frame for the error situation. Furthermore, the system in FIG. 14 comprises the bandwidth enhancer as, for example, illustrated with respect to FIG. 1 indicated at reference numeral 100. The bandwidth enhancer then generates a bandwidth enhanced substitute frame from the typical low band frame or the frame with certain holes provided as the substitute frame from the core audio decoder 140. Thus, the system illustrated in FIG. 14 is an extension to an audio decoder in a situation where the blind bandwidth extension is performed only for a concealment situation, i.e., when a frame loss or an erroneous frame has occurred. Here, the audio codec may have a non-blind bandwidth extension or no bandwidth extension or no bandwidth enhancement processing at all and the presented system extends or predicts a part of the signal missing due to frame loss or the whole missing signal. Thus, the core audio decoder would, for example, be configured to perform a frame only for the core bandwidth which is the substitute frame and, then, the blind bandwidth enhancer enhances the substitute frame generated for the frame loss situation.

Figure 15A:
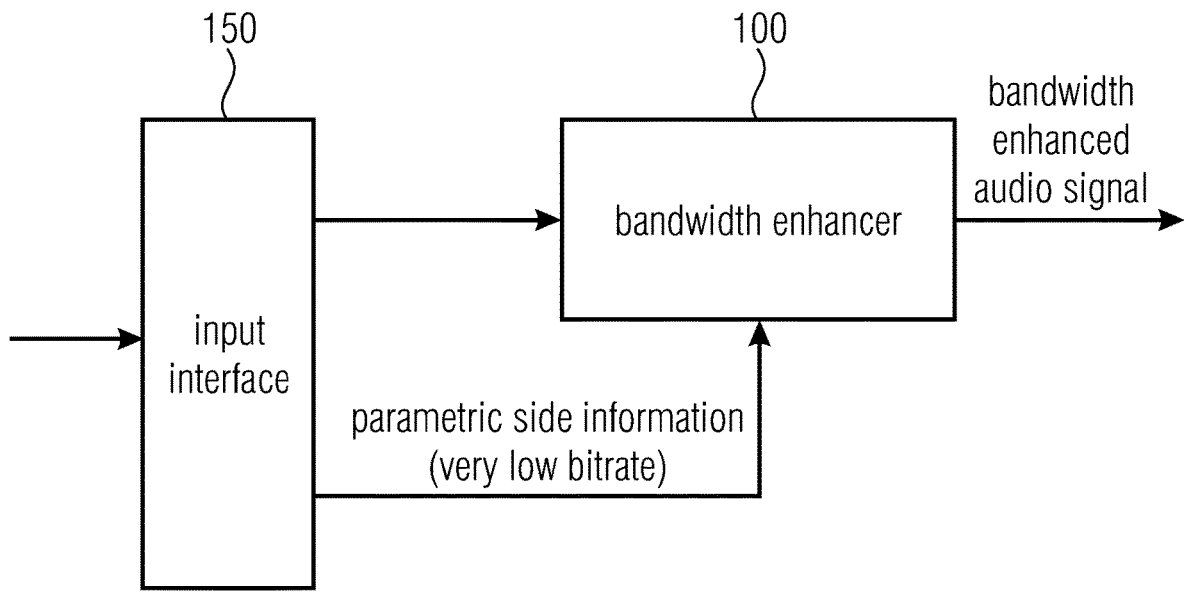
FIG. 15a illustrates an application of the FIG. 1 system in a guided bandwidth extension with very low bitrate parametric side information.
Figure 15B:
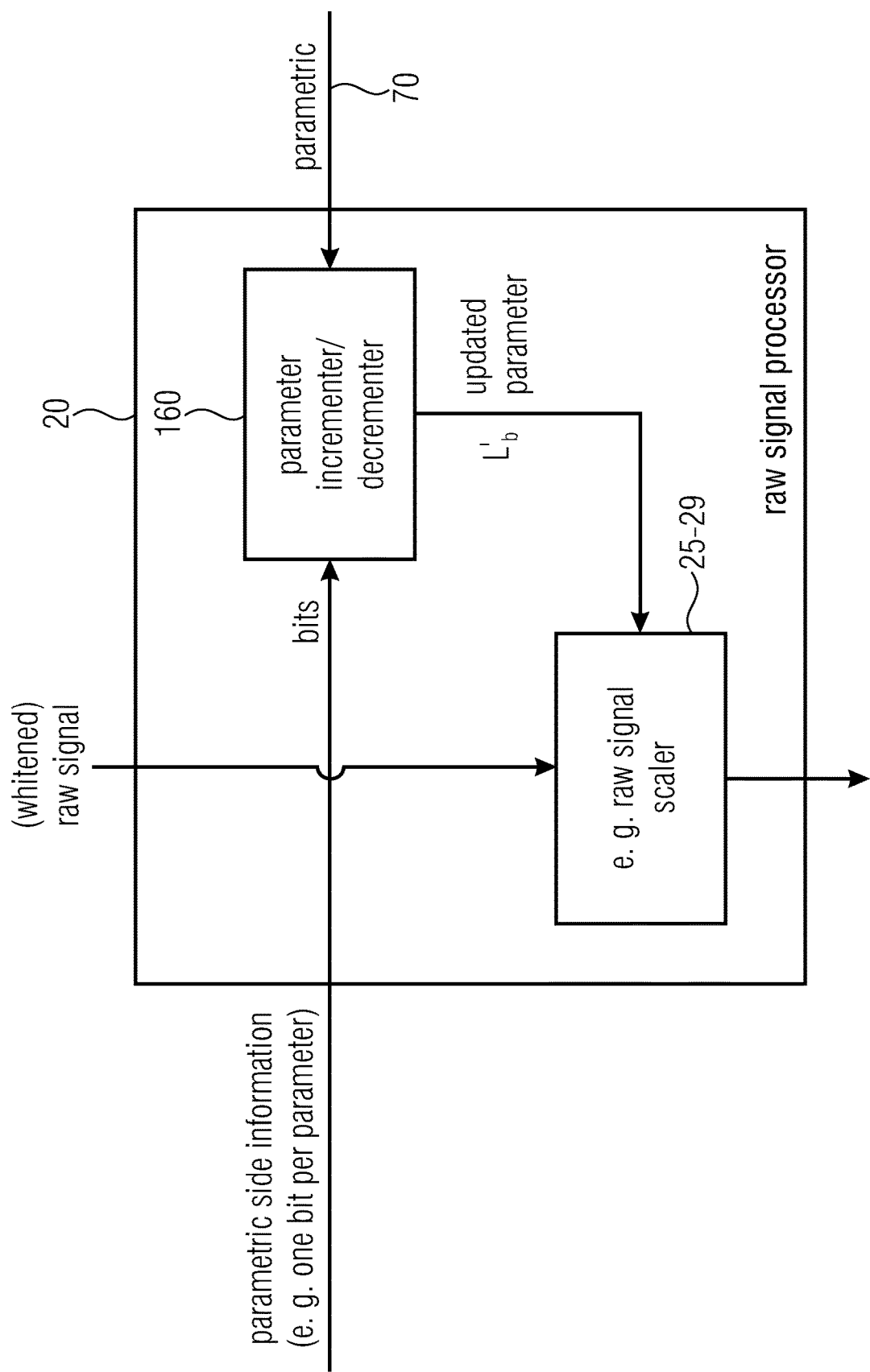
FIG. 15b illustrates an advantageous implementation of the raw signal processor in the context of the FIG. 15a system.

A further embodiment of the present invention is illustrated in FIGS. 15a and 15b. In this use case, the bandwidth enhancer 100 is not only used for a fully blind bandwidth enhancement operation, but for a constituent element of a non-blind bandwidth enhancement operation. In this situation, a coarse description of the parametric representation is used as a first approximation, and this first approximation is later refined by some sort of delta quantization. Thus, the system for processing an audio signal illustrated in FIG. 15a comprises an input interface 150 for receiving an input audio signal and parametric side information for the enhancement frequency range. Furthermore, the bandwidth enhancer 100 is configured to receive, particularly with respect to the raw signal processor 20 of FIG. 1, to use the parametric side information output by the input interface 150 in addition to the parametric representation provided by the neural network processor 30 of FIG. 1 in order to generate the bandwidth-enhanced audio signal.

An advantageous implementation is illustrated in FIG. 15b showing the raw signal processor 20 receiving, at its parameter input, the parametric representation or the parameters 70. In addition to what has been discussed before with respect to the raw signal processor 20, the raw signal processor additionally comprises, in this implementation, a parameter incrementer/decrementer 160. This parameter incrementer/decrementer 160 receives, as its input, the parametric side information, such as a very low bitrate side information consisting only of, for example, a single bit per parameter. Then, the parameter incrementer/decrementer 160 applies the corresponding bit to a parameter of the parametric representation 17 in order to generate an updated parameter, for example $L_{b''}$, and, this updated parameter is then used within the raw signal processing elements such as the elements 25 to 29 illustrated in FIG. 6 instead of the "original" parameter as received from the neural network processor 30. Depending on the implementation, the bit received for each parameter is interpreted by the parameter incrementer/decrementer 160 in the following way. When the bit has a first value, then the parameter received from the neural network processor in incremented by a certain amount and when the bit has the other value, no increment is applied. Alternatively, block 160 performs a parameter decrementing operation by a predefined decrement, when the bit has the first value and does not perform any parameter change when the bit has the second value. In an alternative embodiment, the first value of the bit is interpreted to perform an increment by a predefined increment value and to perform a decrement operation by a certain predefined decrement value when the bit has the other state.

Other procedures can be performed with, for example, two or more bits of side information per each parameter so that, for example, additional increments or certain increment values can be signaled. However, it this embodiment, it is advantageous to use only a single bit for a certain group of parameters in the parameter representation or all parameters in the parameter representation or to use, at the most, only two such bits per parameter in order to keep the bitrate low.

In order to calculate the bit, the same trained neural network is operating on the encoder side as well and, on the encoder side, the parametric representation is calculated from the neural network in the same way as it is done in the decoder-side, and, then, it is determined in the encoder, whether an increment or a decrement or no change of the parametric representation results in a parameter value that has, in the end, a lower error of the decoded signal with respect to the original signal.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded image signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Patrick Bauer, Rosa-Linde Fischer, Martina Bellanova, Henning Puder, and Tim Fingscheidt, "On improving telephone speech intelligibility for hearing impaired persons," in *Proceedings of the 10. ITG Conference on Speech Communication, Braunschweig, Germany, Sep. 26-28, 2012*, 2012, pp. 1-4

[2] Patrick Bauer, Jennifer Jones, and Tim Fingscheidt, "Impact of hearing impairment on fricative intelligibility for artificially bandwidth-extended telephone speech in noise," in *IEEE International Conference on Acoustics, Speech and Signal Processing, ICASSP 2013, Vancouver, BC, Canada, May 26-31, 2013*, pp. 7039-7043.

[3] Stefan Bruhn, Harald Pobloth, Markus Schnell, Bernhard Grill, Jon Gibbs, Lei Miao, Kari Jaervinen, Lasse Laaksonen, Noboru Harada, N. Naka, Stephane Ragot, Stephane Proust, T. Sanda, Imre Varga, C. Greer, Milan Jelinek, M. Xie, and Paolo Usai, "Standardization of the new 3GPP EVS codec," in *2015 IEEE International Conference on Acoustics, Speech and Signal Processing, ICASSP 2015, South Brisbane, Queensland, Australia, Apr. 19-24, 2015*, 2015, pp. 5703-5707.

[4] Johannes Abel, Magdalena Kaniewska, Cyril Guillaume, Wouter Tirry, Hannu Pulakka, Ville Myllylae, Jari Sjoberg, Paavo Alku, Rai Katsir, David Malah, Israel Cohen, M. A. Tugtekin Turan, Engin Erzin, Thomas Schlien, Peter Vary, Amr H. Nour-Eldin, Peter Kabal, and Tim Fingscheidt, "A subjective listening test of six different artificial bandwidth extension approaches in English, Chinese, German, and Korean," in *2016 IEEE International Conference on Acoustics, Speech and Signal Processing, ICASSP 2016, Shanghai, China, Mar. 20-25, 2016*, 2016, pp. 5915-5919.

[5] Peter Jax and Peter Vary, "Wideband extension of telephone speech using a hidden markov model," in *2000 IEEE Workshop on Speech Coding. Proceedings.*, 2000, pp. 133-135.

[6] Patrick Bauer, Johannes Abel, and Tim Fingscheidt, "Hmm-based artificial bandwidth extension supported by neural networks," in *14th International Workshop on Acoustic Signal Enhancement, IWAENC 2014, Juan-les-Pins, France, Sep. 8-11, 2014*, 2014, pp. 1-5.

[7] Hannu Pulakka and Paavo Alku, "Bandwidth extension of telephone speech using a neural network and a filter bank implementation for highband mel spectrum," *IEEE Trans. Audio, Speech & Language Processing*, vol. 19, no. 7, pp. 2170-2183, 2011.

[8] Kehuang Li and Chin-Hui Lee, "A deep neural network approach to speech bandwidth expansion," in *2015 IEEE International Conference on Acoustics, Speech and Signal Processing, ICASSP 2015, South Brisbane, Queensland, Australia, Apr. 19-24, 2015*, 2015, pp. 4395-4399.

[9] Yu Gu, Zhen-Hua Ling, and Li-Rong Dai, "Speech bandwidth extension using bottleneck features and deep recurrent neural networks," in *Interspeech 2016, 17th Annual Conference of the International Speech Communication Association, San Francisco, Calif., USA, Sep. 8-12, 2016*, 2016, pp. 297-301.

[10] Yu Gu and Zhen-Hua Ling, "Waveform modeling using stacked dilated convolutional neural networks for speech bandwidth extension," in *Interspeech 2017, 18th Annual Conference of the International Speech Communication Association, Stockholm, Sweden, Aug. 20-24, 2017*, 2017, pp. 1123-1127.

[11] Aaron van den Oord, Sander Dieleman, Heiga Zen, Karen Simonyan, Oriol Vinyals, Alex Graves, Nal Kalchbrenner, Andrew W. Senior, and Koray Kavukcuoglu, "Wavenet: A generative model for raw audio," in *The 9th ISCA Speech Synthesis Workshop, Sunnyvale, Calif., USA, 13-15 Sep. 2016*, 2016, p. 125.

[12] Sascha Disch, Andreas Niedermeier, Christian R. Helmrich, Christian Neukam, Konstantin Schmidt, Ralf Geiger, Jeremie Lecomte, Florin Ghido, Frederik Nagel, and Bernd Edler, "Intelligent gap filling in perceptual transform coding of audio," in *Audio Engineering Society Convention 141, Los Angeles*, September 2016.

[13] Martin Dietz, Lars Liljeryd, Kristofer Kjorling, and Oliver Kunz, "Spectral band replication, a novel approach in audio coding," in *Audio Engineering Society Convention 112*, April 2002.

[14] Konstantin Schmidt and Christian Neukam, "Low complexity tonality control in the intelligent gap filling tool," in *2016 IEEE International Conference on Acoustics, Speech and Signal Processing, ICASSP 2016, Shanghai, China, Mar. 20-25, 2016*, 2016, pp. 644-648.

[15] Hugo Fastl and Eberhard Zwicker, *Psychoacoustics: Facts and Models*, Springer-Verlag New York, Inc., Secaucus, N.J., USA, 2006.

[16] Yann Lecun, Leon Bottou, Yoshua Bengio, and Patrick Haffner, "Gradient-based learning applied to document recognition," *Proceedings of the IEEE*, vol. 86, no. 11, pp. 2278-2324, November 1998.

[17] Sepp Hochreiter and Juergen Schmidhuber, "Long short-term memory," *Neural Computation*, vol. 9, no. 8, pp. 1735-1780, 1997.

[18] Junyoung Chung, Caglar Guelcehre, KyungHyun Cho, and Yoshua Bengio, "Empirical evaluation of gated recurrent neural networks on sequence modeling," *NIPS Deep Learning workshop, Montreal, Canada*, 2014.

[19] John C. Duchi, Elad Hazan, and Yoram Singer, "Adaptive subgradient methods for online learning and stochastic optimization," in *COLT 2010 —The 23rd Conference on Learning Theory, Haifa, Israel, Jun. 27-29, 2010*, 2010, pp. 257-269.

[20] Francois Chollet et al., "Keras 1.2.2," https://github.com/fchollet/keras, 2015.

[21] Vassil Panayotov, Guoguo Chen, Daniel Povey, and Sanjeev Khudanpur, "Librispeech: An ASR corpus based on public domain audio books," in *2015 IEEE International Conference on Acoustics, Speech and Signal Processing, ICASSP 2015, South Brisbane, Queensland, Australia, Apr. 19-24, 2015*, 2015, pp. 5206-5210.

[22] ITU-T, "ITU-T recommendation P.800. methods for objective and subjective assessment of quality," 1996.

[23] ITU-T, "ITU-T recommendation P.810. modulated noise reference unit (MNRU)," 1996.

The invention claimed is:

1. Apparatus for generating a bandwidth enhanced audio signal from an input audio signal comprising an input audio signal frequency range, comprising:

a raw signal generator configured for generating a raw signal comprising an enhancement frequency range, wherein the enhancement frequency range is not comprised by the input audio signal frequency range;

a neural network processor configured for generating a parametric representation for the enhancement frequency range using the input audio frequency range of the input audio signal and a trained neural network; and a raw signal processor for processing the raw signal using the parametric representation for the enhancement frequency range to acquire a processed raw signal comprising frequency components in the enhancement frequency range, wherein the processed raw signal or the processed raw signal and the input audio signal frequency range of the input audio signal represent the bandwidth-enhanced audio signal, wherein the neural network processor comprises the trained neural network with an input layer and an output layer, wherein the neural network processor is configured to receive, at the input layer, a spectrogram derived from the input audio signal, the spectrogram comprising a time sequence of spectral frames, a spectral frame comprising a number of spectral values, and to output, at the output layer, individual parameters of the parametric representation, wherein the spectral values are linear spectral values or power spectral values processed using a power between 1.5 and 4.5 or processed power values, wherein the processing comprises a compression using a log function or a power function with a power smaller than 1, and wherein the input layer or one or more intermediate layers is formed as a convolutional layer comprising one or more convolutional kernels, wherein a convolutional kernel is configured to perform a convolutional processing of a number of spectral values from at least two different spectral frames in the time sequence of spectral frames, or wherein the trained neural network comprises, as the output layer, or, in addition to the output layer, a recurrent layer, wherein the recurrent layer receives an output vector of a convolutional layer for a time index and outputs an output vector using a recurrent layer function comprising a memory, or wherein the input layer or one or more intermediate layers comprises, for calculating, for each input, an output using a convolutional function of a convolutional layer, wherein the convolutional layer comprises a residual connection, so that at least a group of outputs is a linear combination of the output of the convolutional function and the input into the convolutional function, or wherein the input layer or an intermediate layer is a convolutional layer comprising an output data vector for each integer time index, wherein the trained neural network further comprises an additional convolutional layer comprising one or more kernels for a delated convolution processing, wherein the one or more kernels for the additional convolutional layer receives at least two data vectors from the input layer or the intermediate layer for time indices that are different from each other by more than one integer value to calculate an output vector for a time index, and wherein, for calculating an output vector for a next time index, the one or more kernels receives at least two data vectors from the input layer or the intermediate layer for further time indices that are interleaved to the time indices, or wherein the trained neural network comprises: a first convolutional layer as the input layer for receiving a current frame comprising the input audio signal frequency range of the input audio signal corresponding to a current time index, wherein the first convolutional layer is configured to further using one or more previous frames; at least one second convolutional layer for receiving an output of the first convolutional layer, wherein the at least one second convolutional layer is configured for performing a delated convolution operation to acquire a vector for a current time index; and at least one recurrent layer for processing the vector for the current time index using a recurrent function incurring a memory function covering at least five time indices preceding the current time index, wherein a recurrent layer forms the output layer or wherein the output layer is a fully connected layer receiving an output of a recurrent layer and outputting the individual parameters of the parametric representation.

2. Apparatus of claim 1, wherein the raw signal generator is configured for generating an initial raw signal comprising a first tonality; and spectral whitening the initial raw signal to acquire the raw signal, the raw signal comprising a second tonality, the second tonality being lower than the first tonality.

3. Apparatus of claim 1, wherein the raw signal generator is configured to perform a spectral whitening of the initial raw signal using a first time resolution or to generate the raw signal using a first time resolution, or wherein the raw signal generator is configured to perform a spectral whitening of the initial raw signal using a first frequency resolution or to generate the raw signal using a first frequency resolution, and wherein the neural network processor is configured to generate the parametric representation in a second time resolution, the second time resolution being higher than the first time resolution, or wherein the neural network processor is configured to generate the parametric representation in a second frequency resolution, the second frequency resolution being lower than the first frequency resolution, and wherein the raw signal processor is configured to use the parametric representation with the second time resolution or frequency resolution to process the raw signal in order to acquire the processed raw signal.

4. Apparatus of claim 1, wherein the raw signal generator comprises a patcher for patching a spectral portion of the input audio signal into the enhancement frequency range, the patching comprising a single patching operation or a multiple patching operation, wherein, in the multiple patching operation, a specific spectral portion of the input audio signal is patched to two or more spectral portions of the enhancement frequency range.

5. Apparatus of claim 1, wherein the raw signal processor comprises a time-to-frequency converter for converting an input signal into a spectral representation, the spectral representation comprising the time sequence of spectral frames, a spectral frame comprising spectral values, wherein the neural network processor is configured to feed the spectral frames into the trained neural network or to process the spectral frames to acquire processed spectral frames, in which the spectral values are converted into a power domain comprising a power between 1.5 and 4.5, and advantageously comprising a power of 2 or 3, and wherein the trained neural network is configured to output the parametric representation with respect to the power domain, and wherein the raw signal processor is configured to convert the parametric representation into a linear domain and to apply the linear domain parametric representation to the time-sequence of spectral frames.

6. The apparatus of claim 1, wherein the neural network processor is configured to output the parametric representation in a log representation or a compressed representation comprising a power lower than 0.9, and wherein the raw signal processor is configured to convert the parametric representation from the log representation or the compressed representation into a linear representation.

7. Apparatus of claim 1, in which the raw signal generator comprises:

a time-to-frequency converter for converting the input audio signal into the time sequence of spectral frames, a spectral frame comprising a sequence of values;

a patcher for generating a patched signal for each spectral frame using the output of the time-to-frequency converter;

a whitening stage for spectrally whitening the patched signal for each spectral frame or for whitening a corresponding signal from the time-to-frequency converter before performing the patching operation by the patcher; and a frequency-to-time converter for converting a sequence of frames comprising patched and spectrally whitened frames into a time domain to acquire the raw signal, wherein the frequency-to-time converter is configured to accommodate the enhancement frequency range.

8. Apparatus of claim 1, wherein a whitening stage within the raw signal processor comprises:

a low-pass filter for low-pass filtering the spectral frame or a power representation of the spectral frame to acquire an envelope estimate for the spectral frame; and a calculator for calculating a whitened signal by dividing the spectral frame by the envelope estimate, wherein, when the envelope is derived from the power representation, the divider calculates linear weighting factors for spectral values and divides the spectral values by the linear weighting factors.

9. Apparatus of claim 1, wherein the raw signal processor comprises a time-to-frequency converter for converting the input audio signal or a signal derived from the input audio signal and the raw signal into a spectral representation, wherein the neural network processor is configured to receive a spectral representation of the input audio signal frequency range, wherein the raw signal processor comprises a spectral processor for applying the parametric representation provided by the neural network processor in response to the spectral representation of the input audio signal frequency range to the spectral representation of the raw signal; and wherein the raw signal processor furthermore comprises a frequency-to-time converter for converting a processed spectral representation of the raw signal into the time domain, wherein the apparatus is configured to perform a combination of the processed raw signal and the input audio signal frequency range by feeding the processed spectral representation and the spectral representation of the input audio signal frequency range to the frequency-time-converter or by combining a time representation of the input audio signal frequency range and a time representation of the processed raw signal in the time domain.

10. Apparatus of claim 1, wherein the convolutional kernel is configured to perform a two-dimensional convolutional processing involving a first number of spectral values per spectral frame and a second number of spectral frames in the time sequence of spectral frames, wherein the first number and the second number are at least two and lower than ten.

11. Apparatus of claims 1, wherein the input layer or the first intermediate layer comprises at least one kernel processing spectral values being adjacent in frequency and adjacent in time, and wherein the trained neural network further comprises an intermediate convolutional layer operating based on a delation factor so that, with respect to a time index, only every second or every third result of a preceding layer in a stack of layers is received by the convolutional layer as input.

12. Apparatus of claim 1, wherein the recurrent layer comprises a long/short-term memory (LSTM) function or comprises a gated recurrent unit (GRU) function or is an IIR filter function.

13. Apparatus of claim 1, wherein the output layer comprises one or more fully connected layers, wherein the fully connected layer or a highest fully connected layer provides, at an output, the individual parameters of the parametric representation for a current time frame of the raw signal and wherein one fully connected layer is configured to receive, at an input thereof, output values of an input layer or an intermediate layer for the current time frame.

14. Apparatus of claim 1,
wherein the parametric representation comprises a spectral envelope value for each band of a plurality of enhancement frequency range bands, wherein the plurality of enhancement frequency range bands together form the enhancement frequency range, and
wherein each enhancement frequency band comprises at least two spectral values, and
wherein the raw signal processor is configured to scale the at least two spectral values of the raw signal in an enhancement frequency range band using a spectral envelope value for the enhancement frequency range band.

15. Apparatus of claim 14,
wherein the spectral envelope value indicates a measure for an absolute energy of the enhancement frequency band to which the spectral envelope value is associated to,
wherein the raw signal processor is configured to calculate a measure for an energy of the raw signal in the enhancement frequency range band,
wherein the raw signal processor is configured to scale the amplitude values using the measure for the absolute energy so that the scaled spectral values in the enhancement frequency band comprise an energy as indicated by the measure for the absolute energy.

16. Apparatus of claim 15,
wherein the raw signal processor is configured for calculating a scaling factor from the measure for the energy of the signal in the enhancement frequency band and from the measure for the absolute energy of the enhancement frequency range band derived from the parametric representation.

17. Apparatus of claim 14,
wherein the raw signal processor is configured to calculate the scaled spectral values based on the following equation:

$$f_b = \frac{e^{L_b}}{\sum_j |X_j|2},$$

wherein $f_b$ is a ratio of a logarithmic energy estimate $L_b$ and an energy of the bins $X_j$ in a band b, wherein j iterates over all bins inside the band b, and wherein $L_b$ is a an individual parameter comprised by the parametric representation.

18. Apparatus of claim 1,
wherein the audio signal frequency range is a narrowband frequency range, and
wherein the enhancement frequency range comprises frequencies being greater than a greatest frequency in the narrowband frequency range.

19. Apparatus of claim 1,
wherein the neural network processor is configured to provide, as the individual parameters, at least one parameter of the group of parameters comprising a tonality parameter, a temporal envelope parameter, a spectral envelope parameter, a set of scale factor band energies, a set of distribution quantizer values or energy and tilt parameters, and wherein the raw signal processor is configured to apply to individual parameters to the raw signal to acquire the processed raw signal.

20. System for processing an audio signal, comprising:
a core audio decoder for decoding a core audio signal organized in frames, wherein the core audio decoder is configured for detecting an error situation involving a frame loss or an erroneous frame, and
wherein the core audio decoder is configured to perform an error concealment operation to acquire a substitute frame for the error situation, and
the apparatus of claim 1, wherein the apparatus is configured for using the substitute frame as the input audio signal and for generating the bandwidth enhanced audio signal for the error situation.

21. System for processing an audio signal, comprising:
an input interface for receiving an input audio signal and parametric side information for the enhancement frequency range;
the apparatus for generating a bandwidth-enhanced audio signal in accordance with claim 1,
wherein the raw signal processor is configured to use the parametric side in-formation in addition to the parametric representation provided by the neural network processor to generate the bandwidth-enhanced audio signal.

22. System of claim 21,
wherein the parametric side information comprises one bit associated with a parameter of the individual parameters provided by the neural network processor, and
wherein the raw signal processor is configured to modify the individual parameters provided by the neural network processor by an increment in accordance with a value of the bit for a certain parameter.

23. Method of generating a bandwidth enhanced audio signal from an input audio signal comprising an input audio signal frequency range, the method comprising:
generating a raw signal comprising an enhancement frequency range, wherein the enhancement frequency range is not comprised by the input audio signal frequency range;
generating a parametric representation for the enhancement frequency range using the input audio frequency range of the input audio signal and a trained neural network; and
processing the raw signal using the parametric representation for the enhancement frequency range to acquire a processed raw signal comprising frequency components in the enhancement frequency range,
wherein the processed raw signal or the processed raw signal and the input audio signal frequency range of the input audio signal represent the bandwidth-enhanced audio signal;
wherein the trained neural network comprises an input layer and an output layer, wherein the generating the parametric representation comprises receiving, at the input layer, a spectrogram derived from the input audio signal, the spectrogram comprising a time sequence of spectral frames, a spectral frame comprising a number of spectral values, and outputting, at the output layer, individual parameters of the parametric representation, wherein the spectral values are linear spectral values or power spectral values processed using a power between 1.5 and 4.5 or processed power values, wherein the processing comprises a compression using a log function or a power function with a power smaller than 1, and wherein the input layer or one or more intermediate layers is formed as a convolutional layer comprising one or more convolutional kernels, wherein a convolutional kernel is configured to perform a convolutional processing of a number of spectral values from at least two different spectral frames in the time sequence of spectral frames, or wherein the trained neural network comprises, as the output layer, or, in addition to the output layer, a recurrent layer, wherein the recurrent layer receives an output vector of a convolutional layer for a time index and outputs an output vector using a recurrent layer function comprising a memory, or wherein the input layer or one or more intermediate layers comprises, for calculating, for each input, an output using a convolutional function of a convolutional layer, wherein the convolutional layer comprises a residual connection, so that at least a group of outputs is a linear combination of the output of the convolutional function and the input into the convolutional function, or wherein the input layer or an intermediate layer is a convolutional layer comprising an output data vector for each integer time index, wherein the trained neural network further comprises an additional convolutional layer comprising one or more kernels for a delated convolution processing, wherein the one or more kernels for the additional convolutional layer receives at least two data vectors from the input layer or the intermediate layer for time indices that are different from each other by more than one integer value to calculate an output vector for a time index, and wherein, for calculating an output vector for a next time index, the one or more kernels receives at least two data vectors from the input layer or the intermediate layer for further time indices that are interleaved to the time indices, or wherein the trained neural network comprises: a first convolutional layer as the input layer for receiving a current frame comprising the input audio signal frequency range of the input audio signal corresponding to a current time index, wherein the first convolutional layer is configured to further using one or more previous frames; at least one second convolutional layer for receiving an output of the first convolutional layer, wherein the at least one second convolutional layer is configured for performing a delated convolution operation to acquire a vector for a current time index; and at least one recurrent layer for processing the vector for the current time index using a recurrent function incurring a memory function covering at least five time indices preceding the current time index, wherein a recurrent layer forms the output layer or wherein the output layer is a fully connected layer receiving an output of a recurrent layer and outputting the individual parameters of the parametric representation.

24. Method of processing an audio signal, comprising:
decoding a core audio signal organized in frames, wherein the core audio decoder is configured for detecting an error situation involving a frame loss or an erroneous frame, and wherein the decoding performs an error concealment operation to acquire a substitute frame for the error situation, and the method of claim 23, wherein the method uses the substitute frame as the input audio signal and generates the bandwidth enhanced audio signal for the error situation.

25. Method of processing an audio signal, comprising:
receiving an input audio signal and parametric side information for the enhancement frequency range;
generating a bandwidth-enhanced audio signal in accordance with the method of claim 23,
wherein the processing the raw signal comprises using the parametric side in-formation in addition to the parametric representation provided by the trained neural network to generate the bandwidth-enhanced audio signal.

26. A non-transitory digital storage medium having a computer program stored thereon to perform the method of generating a bandwidth enhanced audio signal from an input audio signal comprising an input audio signal frequency range, said method comprising:

generating a raw signal comprising an enhancement frequency range, wherein the enhancement frequency range is not comprised by the input audio signal frequency range;

generating a parametric representation for the enhancement frequency range using the input audio frequency range of the input audio signal and a trained neural network; and processing the raw signal using the parametric representation for the enhancement frequency range to acquire a processed raw signal comprising frequency components in the enhancement frequency range, wherein the processed raw signal or the processed raw signal and the input audio signal frequency range of the input audio signal represent the bandwidth-enhanced audio signal, wherein the trained neural network comprises an input layer and an output layer, wherein the generating the parametric representation comprises receiving, at the input layer, a spectrogram derived from the input audio signal, the spectrogram comprising a time sequence of spectral frames, a spectral frame comprising a number of spectral values, and outputting, at the output layer, individual parameters of the parametric representation, wherein the spectral values are linear spectral values or power spectral values processed using a power between 1.5 and 4.5 or processed power values, wherein the processing comprises a compression using a log function or a power function with a power smaller than 1, and wherein the input layer or one or more intermediate layers is formed as a convolutional layer comprising one or more convolutional kernels, wherein a convolutional kernel is configured to perform a convolutional processing of a number of spectral values from at least two different spectral frames in the time sequence of spectral frames, or wherein the trained neural network comprises, as the output layer, or, in addition to the output layer, a recurrent layer, wherein the recurrent layer receives an output vector of a convolutional layer for a time index and outputs an output vector using a recurrent layer function comprising a memory, or wherein the input layer or one or more intermediate layers comprises, for calculating, for each input, an output using a convolutional function of a convolutional layer, wherein the convolutional layer comprises a residual connection, so that at least a group of outputs is a linear combination of the output of the convolutional function and the input into the convolutional function, or wherein the input layer or an intermediate layer is a convolutional layer comprising an output data vector for each integer time index, wherein the trained neural network further comprises an additional convolutional layer comprising one or more kernels for a delated convolution processing, wherein the one or more kernels for the additional convolutional layer receives at least two data vectors from the input layer or the intermediate layer for time indices that are different from each other by more than one integer value to calculate an output vector for a time index, and wherein, for calculating an output vector for a next time index, the one or more kernels receives at least two data vectors from the input layer or the intermediate layer for further time indices that are interleaved to the time indices, or wherein the trained neural network comprises: a first convolutional layer as the input layer for receiving a current frame comprising the input audio signal frequency range of the input audio signal corresponding to a current time index, wherein the first convolutional layer is configured to further using one or more previous frames; at least one second convolutional layer for receiving an output of the first convolutional layer, wherein the at least one second convolutional layer is configured for performing a delated convolution operation to acquire a vector for a current time index; and at least one recurrent layer for processing the vector for the current time index using a recurrent function incurring a memory function covering at least five time indices preceding the current time index, wherein a recurrent layer forms the output layer or wherein the output layer is a fully connected layer receiving an output of a recurrent layer and outputting the individual parameters of the parametric representation when said computer program is run by a computer.

27. A non-transitory digital storage medium having a computer program stored thereon to perform the method of decoding a core audio signal organized in frames, wherein the core audio decoder is configured for detecting an error situation involving a frame loss or an erroneous frame, and
wherein the decoding performs an error concealment operation to acquire a substitute frame for the error situation, and
the method of claim 23, wherein the method uses the substitute frame as the input audio signal and generates the bandwidth enhanced audio signal for the error situation,
when said computer program is run by a computer.

28. A non-transitory digital storage medium having a computer program stored thereon to perform the method of processing an audio signal, said method comprising:
receiving an input audio signal and parametric side information for the enhancement frequency range;
generating a bandwidth-enhanced audio signal in accordance with the method of claim 23,
wherein the processing the raw signal comprises using the parametric side in-formation in addition to the parametric representation provided by the trained neural network to generate the bandwidth-enhanced audio signal,
when said computer program is run by a computer.

* * * * *